(12) United States Patent
Sakanoue et al.

(10) Patent No.: US 7,557,567 B2
(45) Date of Patent: Jul. 7, 2009

(54) MAGNETIC DETECTION DEVICE

(75) Inventors: Hiroshi Sakanoue, Chiyoda-ku (JP);
Masahiro Yokotani, Chiyoda-ku (JP);
Yuji Kawano, Chiyoda-ku (JP);
Yasuyoshi Hori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/946,438

(22) Filed: Nov. 28, 2007

(65) Prior Publication Data
US 2009/0027046 A1 Jan. 29, 2009

(30) Foreign Application Priority Data
Jul. 27, 2007 (JP) .............................. 2007-196061

(51) Int. Cl.
*G01R 33/06* (2006.01)
(52) U.S. Cl. .............................. 324/207.22; 324/207.21
(58) Field of Classification Search ............ 324/207.22, 324/207.21, 207.24, 207.25, 165; 340/672
See application file for complete search history.

(56) References Cited

U.S. PATENT DOCUMENTS

| | | | |
|---|---|---|---|
| 6,282,954 | B1 | 9/2001 | Ott et al. |
| 6,630,821 | B2 | 10/2003 | Shinjo et al. |
| 7,265,541 | B1 | 9/2007 | Yokotani et al. |
| 2007/0200561 | A1 | 8/2007 | Yokotani et al. |

*Primary Examiner*—Reena Aurora
(74) *Attorney, Agent, or Firm*—Sughrue Mion, PLLC

(57) ABSTRACT

A magnetic detection device is provided in which a first signal is outputted in accordance with the mutual phase relationship between the output of a first magnetoelectric conversion output circuit and the output of a second magnetoelectric conversion output circuit that are based on the movement, in forward direction, of a detection subject, thereby generating a pulse of a high level 1 and a low level 1; a second signal is outputted in accordance with the mutual phase relationship between the output of the first magnetoelectric conversion output circuit and the output of the second magnetoelectric conversion output circuit that are based on the movement, in forward direction, of the detection subject; an output signal processing circuit for generating a pulse of a high level 2 and a low level 2 is provided; and not only the pulse of the high level 1 and the low level 1 does not cross the other comparison level, but also the pulse of the high level 2 and the low level 2 does not cross the one comparison level.

6 Claims, 20 Drawing Sheets

(a)
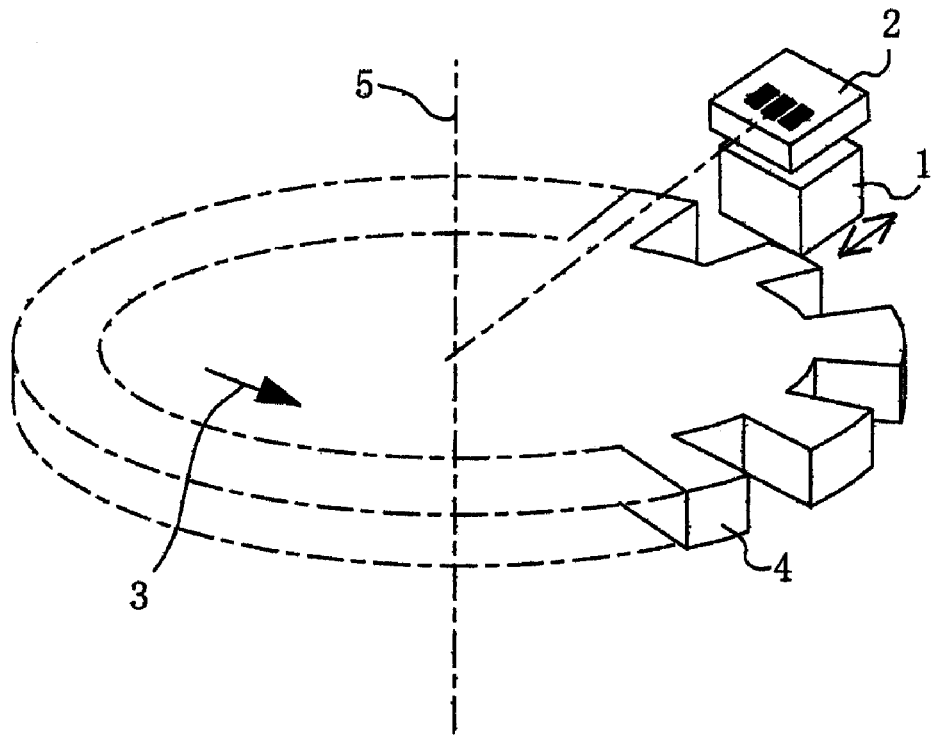
(b)
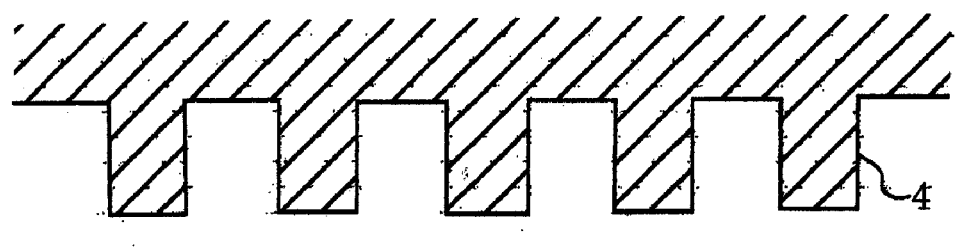
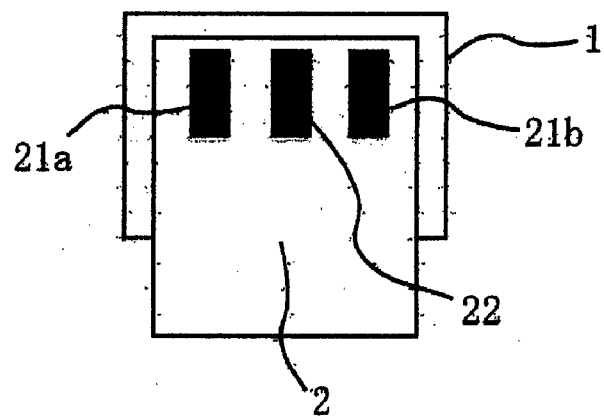
Fig. 18    PRIOR ART

Fig. 20 Prior Art

MAGNETIC DETECTION DEVICE

BACKGROUND OF THE INVENTION

1. Field of the Invention

The present invention relates to a magnetic detection device for detecting the moving direction of a tooth-shaped magnetic moving body.

2. Description of the Related Art

FIG. 18 is a magnetic-circuit configuration diagram for a conventional magnetic detection device utilizing a magnetic detection element.

FIG. 18(a) is a perspective view; FIG. 18(b) is an elevation view. FIG. 19 is an electric circuit diagram for a conventional magnetic detection device; FIG. 20 is a set of waveforms at respective points in the electric circuit diagram in FIG. 19; FIG. 20 also includes a set of diagrams and a table for explaining the waveforms. The foregoing constituent elements are disclosed in U.S. Pat. No. 6,630,821. The magnetic detection device includes a rectangular-parallelepiped magnet 1 for generating a biasing magnetic field and an IC chip 2 that is provided on the magnet 1 and in which three magnetoresistance elements as magnetic detection elements (magnetoelectric conversion elements) are integrated. The arrow in the vicinity of the magnet 1 indicates the direction in which the magnet 1 is magnetized. First, second, and third magnetoresistance elements (referred to as MR elements) 21a, 21b and 22 included in the IC chip 2 are made to be close to and to face a gear-shaped magnetic rotating body (tooth-shaped magnetic moving body) 4, and in the rotation direction of the tooth-shaped magnetic rotating body, the first, third, and second, magnetoresistance elements 21a, 22, and 21b are arranged in that order. Reference numeral 5 denotes the rotation axis of the gear-shaped magnetic rotating body 4; an arrow 3 for the gear-shaped magnetic rotating body 4 indicates the rotation direction of the gear-shaped magnetic rotating body 4. The first and second MR elements 21a and 21b configure a bridge circuit 23; the third MR element 22 and resistor 6 configure a bridge circuit 30.

The rotation of the gear-shaped magnetic rotating body 4 causes the recesses and the protrusions of the gear-shaped magnetic rotating body 4 to alternately approach to the first, second, and third MR elements 21a, 21b, and 22 of the magnetic detection device 1.

Accordingly, the magnetic field that is applied by the magnet 1 to the first, second, and third MR elements 21a, 21b, and 22 is changed. The change in the magnetic field results in changes in the resistance values of the first, second, and third MR elements 21a, 21b, and 22; thus, as changes in respective voltages across the MR elements, the outputs of two bridge circuit systems can be obtained.

The first MR element 21a in the bridge circuit 23 is preferably connected to a constant-voltage and constant-current power source Vcc; the second MR element 21b is earthed; the connection point 7 between the first MR element 21a and the second MR element 21b is connected to the inversion input terminal of a first comparison circuit 29. One terminal of the resistor 8/9 is connected to the power source Vcc; the other terminal is earthed; the connection point 10 between the resistor 8 and the resistor 9 is connected, as a reference voltage, to the non-inversion input terminal of a first comparison circuit 29.

The third MR element 22 of the bridge circuit 30 is preferably connected to a constant-voltage and constant-current power source Vcc; the resistor 6 is earthed; the connection point 11 between the third MR element 22 and the resistor 6 is connected to the inversion input terminal of a second comparison circuit 36. One terminal of the resistor 12/13 is connected to the power source Vcc and the other terminal thereof is earthed; the connection point 14 between the resistor 12 and the resistor 13 is connected, as a reference voltage, to the non-inversion input terminal of the second comparison circuit 36.

In addition, the first MR element 21a and the second MR element 21b configure a first magnetoelectric conversion element; the third MR element 22 and the resistor 6 configure a second magnetoelectric conversion element. In general, as a magnetic detection element, a magnetoresistance element (an MR element) is utilized. An MR element is an element whose resistance value changes depending on the angle between the magnetization direction and the current direction. The resistance value of the MR element becomes minimal when the current direction and the magnetization direction perpendicularly intersect each other and becomes maximal when the angle between the magnetization direction and the current direction is zero degrees, i.e., when the current direction and the magnetization direction coincide with each other or they are entirely opposite to each other.

The respective outputs of the two bridge circuits described above are converted by the corresponding first and second comparison circuits (first and second magnetoelectric conversion output circuits) 29 and 36 into rectangular waves; one output signal e (of the first comparison circuit 29) is connected to the base of an open-collector output transistor 371 and the D terminal of a D-flip-flop circuit (D-FF) 38; the other output signal f (of the second comparison circuit 36) is connected to the CL terminal of the D-FF 38. The output terminal of the D-FF 38 is connected by way of a resistor 391 to the base of a output transistor 401 whose collector is connected to the power-source terminal Vcc; the emitter of the output transistor 401 is connected to the emitter of the output transistor 371 and earthed by way of a resistor 411. In addition, the D-FF 38 is well known; when the CL input thereof is "L (low-level)", the output maintains the previous state, regardless of the level of the D terminal; in the case where, when the CL input is a rising edge trigger of "H (high level)", the D terminal is "H", the output is rendered "H"; in the case where the D terminal is "L", the output is rendered "L".

The output signal h of the output transistor 371 is conveyed to a computer unit 42, connected, in the computer unit 42, to the power-source terminal Vcc, by way of a resistor 15, and further connected to the respective inversion input terminals of third and fourth comparison circuits 44 and 45. One terminal of a resistor 16/17 is connected to the power source Vcc; the other terminal is earthed; the connection point 18 between the resistors 16 and 17 is connected, as a comparison level 1 (reference voltage), to the non-inversion input terminal of the third comparison circuit 44. Similarly, one terminal of a resistor 19/20 is connected to the power source Vcc; the other terminal is earthed; the connection point 24 between the resistors 19 and 20 is connected, as a comparison level 2 (reference voltage), to the non-inversion input terminal of the fourth comparison circuit 45. The comparison level 1 and the comparison level 2 for the foregoing third and fourth comparison circuits 44 and 45, respectively, are different from each other and set in such a way that the comparison level 1 is larger than the comparison level 2; therefore, the output signals of the third and fourth comparison circuits 44 and 45 are different from each other.

Next, the operation will be explained. FIG. 20 is a set of waveforms c to j at the points c to j in the electric circuit diagram in FIG. 19; FIG. 20(a) represents the waveforms in the case where the gear-shaped magnetic rotating body 4 rotates forward; FIG. 20(b) represents the waveforms in the case where the gear-shaped magnetic rotating body 4 rotates backward. In the case of the forward rotation (a), the gear-shaped magnetic rotating body 4 approaches the MR element 21a, the MR element 22, and the MR element 21b in that order, thereby reducing the resistance values of the MR elements; therefore, the output (a rectangular wave signal) e, of the first comparison circuit 29, derived from the signal c in the bridge circuit 23 for the MR element 21a is advanced in phase (occurrence timing) than the output (a rectangular wave signal) f, of the second comparison circuit 36, derived from the signal d in the bridge circuit 30 for the MR element 22.

Accordingly, in the case where the D-FF 38, which is a rising-edge trigger type, is utilized, the output g of the D-FF 38 is always high-level "H (a first signal)". The output transistor 401 connected to the output of the D-FF 38 becomes "ON", thereby supplying a current to the resistor 411 connected between the emitter and the ground of the output transistor 371. When the output transistor 371 is "OFF", the level of the output h is a high level that is decided by the voltage at the power-source terminal Vcc in the computer unit 42, regardless of whether the gear-shaped magnetic rotating body 4 rotates forward or backward; When the output transistor 371 is "ON", the level of the output h becomes a low level 1 that is decided by the multiplication product of the sum of a current supplied by the output transistor 371 and a current supplied by the output transistor 401 connected to the output of the D-FF 38 and the resistant value of the resistor 411 connected between the emitter of the output transistor 371 and the ground.

In contrast, in the case of the backward rotation (b), the gear-shaped magnetic rotating body 4 approaches the MR element 21b, the MR element 22, and the MR element 21a in that order, thereby reducing the resistance values of the MR elements; therefore, the output f, of the second comparison circuit 36, derived from the signal d in the bridge circuit 30 for the MR element 22 is advanced in phase (occurrence timing) than the output e, of the first comparison circuit 29, derived from the signal c in the bridge circuit 23 for the MR element 21a. Accordingly, the output g of the D-FF 38 is always low-level "L (a second signal)", whereby the output transistor 401 connected to the output of the D-FF 38 becomes "OFF"; therefore, no current can be supplied through the output transistor 401 to the resistor 411 connected between the emitter of the output transistor 371 and the ground. Accordingly, when the output transistor 371 is "ON", the level of the output h becomes a low level 2 that is decided by the multiplication product of a current supplied by the output transistor 371 and the resistance value of the resistor 411 connected between the emitter of the output transistor 371 and the ground. In this case, the output h may take three values; the magnitude relationship among the values is in such a way that the high level>the low level 1>the low level 2. In addition, the MR element 21b is a magnetoresistance element; however, the bridge circuit 23 can be realized even when the MR element 21b is replaced by a normal resistor.

As a result, the output g of the D-FF 38 becomes high-level "H" (the first signal) in the case of the forward rotation and becomes low-level "L" (the second level) in the case of the backward rotation. Accordingly, it is made possible to detect the rotation direction, based on the value of the output g of the D-FF 38. In addition, in the case of the forward rotation, the output h of the output transistor 371 becomes a pulse signal having two values, i.e., the high level and the low level 1; in the case of the backward rotation, the output h becomes a pulse signal having two values, i.e., the high level and the low level 2; therefore, it is made possible to detect the rotation direction, based on the value of the low level 1 or 2. Additionally, the rotation position and the rotation speed of the gear-shaped magnetic rotating body 4 can be detected based on the pulse having two values.

Furthermore, the output h of the output transistor 371 is applied to the computer unit 42, the comparison level 1 for the third comparison circuit 44 in the computer unit 42 is set to a level between the high level and the low level 1, and the comparison level 2 for the fourth comparison circuit 45 is set to a level between the low level 1 and the low level 2, so that the rotation direction can be detected. That is to say, the case where no signal appears at the output terminal j of the fourth comparison circuit 45 corresponds to the case where the gear-shaped magnetic rotating body 4 rotates forward; the case where a specific signal appears at the output terminal j corresponds to the case where the gear-shaped magnetic rotating body 4 rotates backward. Additionally, at the output terminal i of the third comparison circuit 44, a specific signal appears in either case of the forward or the backward rotation.

Additionally, as can be seen from the waveform charts in FIG. 20, because the signal c (pulse), in the bridge circuit 23 for the MR element 21a, corresponding to the tooth position of the gear-shaped magnetic rotating body 4 is in synchronization with the pulse at the output h of the output transistor 371, regardless of the rotation direction, the facing condition of the gear-shaped magnetic rotating body 4 (whether the protrusion is facing or the recess is facing the MR element 21a) can be discriminated, based on the pulse at the output h; therefore, the magnetic detection device is useful in a control system that requires such a function. In addition, the conventional magnetic detection device disclosed in U.S. Pat. No. 6,630,821 discriminates the moving direction of the tooth-shaped magnetic moving body, by, as described above, utilizing the rising edge of a single rectangular wave signal; therefore, the timing of detecting the moving direction of the tooth-shaped magnetic moving body is delayed.

SUMMARY OF THE INVENTION

The objective of the present invention is to obtain a magnetic detection device capable of detecting the moving direction of a tooth-shaped magnetic moving body accurately and without making any erroneous detection.

A magnetic detection device according to the present invention is provided with first and second magnetoelectric conversion elements, which are disposed in a biasing magnetic field in such a way as to be in a row along a direction in which a tooth-shaped magnetic moving body as a detection subject moves and to face the tooth-shaped magnetic moving body, for producing changes in electric quantity in accordance with a condition change, in the biasing magnetic field, due to the movement of the detection subject; a first magnetoelectric conversion output circuit for outputting a change in electric quantity produced by the first magnetoelectric conversion element; a second magnetoelectric conversion output circuit for outputting a change in electric quantity produced by the second magnetoelectric conversion element; an output signal processing circuit for outputting a first signal in accordance with the mutual phase relationship between the output of the first magnetoelectric conversion output circuit and the output of the second magnetoelectric conversion output circuit based on the movement, in forward direction, of the detection subject and based on the first signal output and the output of the magnetoelectric conversion output circuit, generating a pulse of a high level 1 and a low level 1 and for outputting a second signal in accordance with the mutual phase relationship between the output of the first magnetoelectric conversion output circuit and the output of the second magnetoelectric conversion output circuit based on the movement, in backward direction, of the detection subject and based on the second signal output and the output of the magnetoelectric conversion output circuit, generating a pulse of a high level 2 and a low level 2 that each are different from at least one of the high level 1 and the low level 1; one comparison circuit for comparing a pulse outputted by the output signal processing circuit with one comparison level and outputting the comparison result; and the other comparison circuit for comparing a pulse outputted by the output signal processing circuit with the other comparison level that is different from the one comparison level and outputting the comparison result. The output signal processing circuit is configured in such a way that not only the pulse of the high level 1 and the low level 1 does not cross the other comparison level, but also the pulse of the high level 2 and the low level 2 does not cross the one comparison level.

According to a magnetic detection device of the present invention, it is made possible to detect the moving direction of a tooth-shaped magnetic moving body accurately and without making any erroneous detection. In particular, an excellent detection can be performed without making any erroneous discrimination even in the case of the alternate operation, between the forward rotation and the backward rotation, caused by a vibration of the tooth-shaped magnetic moving body or the like.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 also includes a diagram and a set of tables for explaining the waveforms;

FIG. 9 also includes a diagram and a table for explaining the waveforms;

FIG. 11 also includes a set of diagrams for explaining the waveforms;

FIG. 12 also includes a set of tables and a diagram for explaining the waveforms;

FIG. 13 also includes a table and a diagram for explaining the waveforms;

FIG. 16 also includes a diagram and a table for explaining the waveforms;

FIG. 18 is a magnetic-circuit configuration diagram for a conventional magnetic detection device;

FIG. 20 is a set of waveforms, at respective points in the electric circuit diagram illustrated in FIG. 19; FIG. 20 also includes a set of diagrams and a table for explaining the waveforms.

DETAILED DESCRIPTION OF THE INVENTION

[Technology as a basis of the Present Invention]

In the first place, a magnetic detection device as a basis of the present invention will be explained. A magnetic detection device as a basis of the present invention detects the moving direction of a magnetic moving body four times as fast as a conventional magnetic detection device does, by utilizing the respective rising edges and the respective falling edges of two rectangular wave signals, thereby detecting the moving direction of a tooth-shaped magnetic moving body (magnetic moving body).

Figure 1:
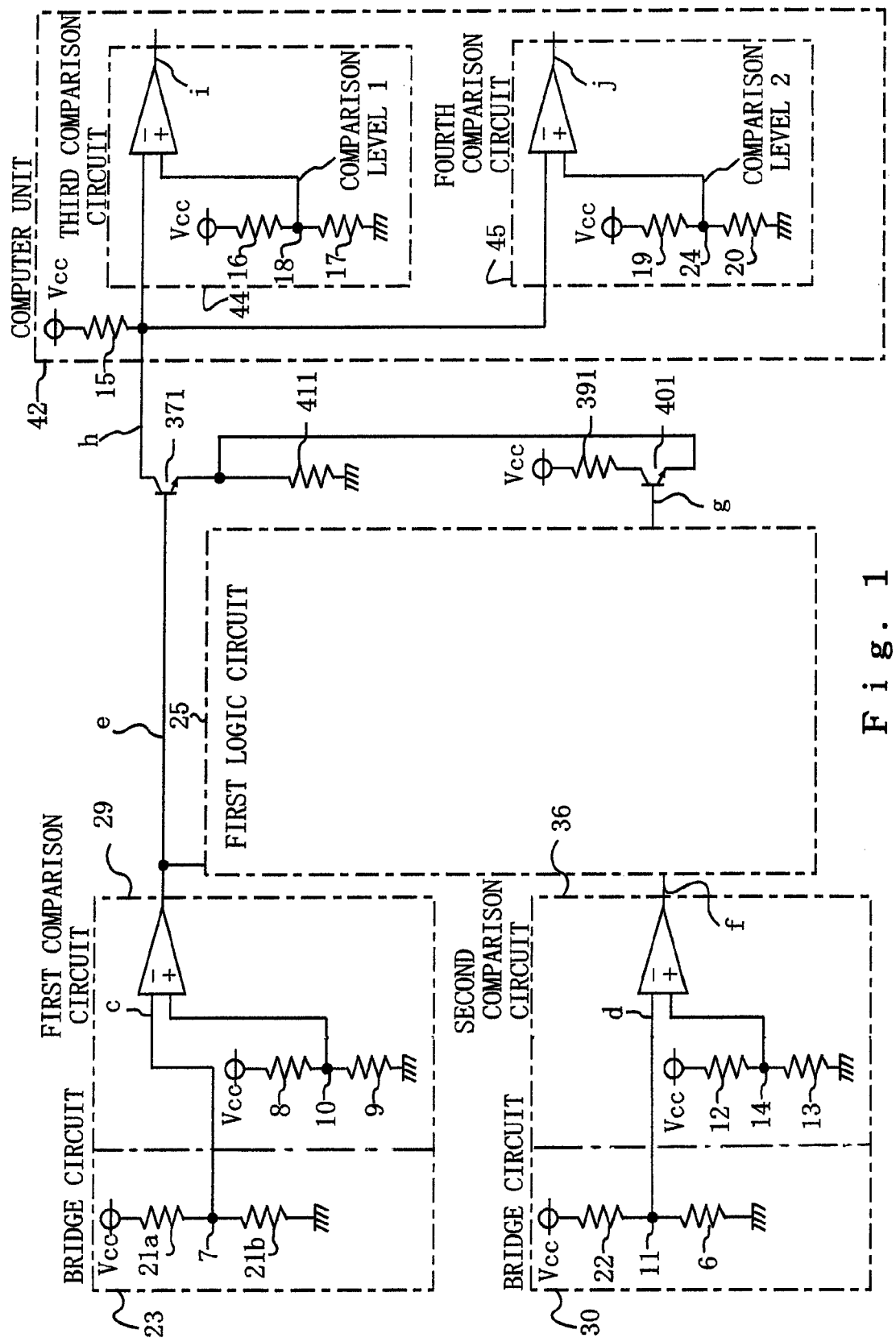
FIG. 1 is an electric circuit diagram for a magnetic detection device according to the basic technology of the present invention.
Figure 2:
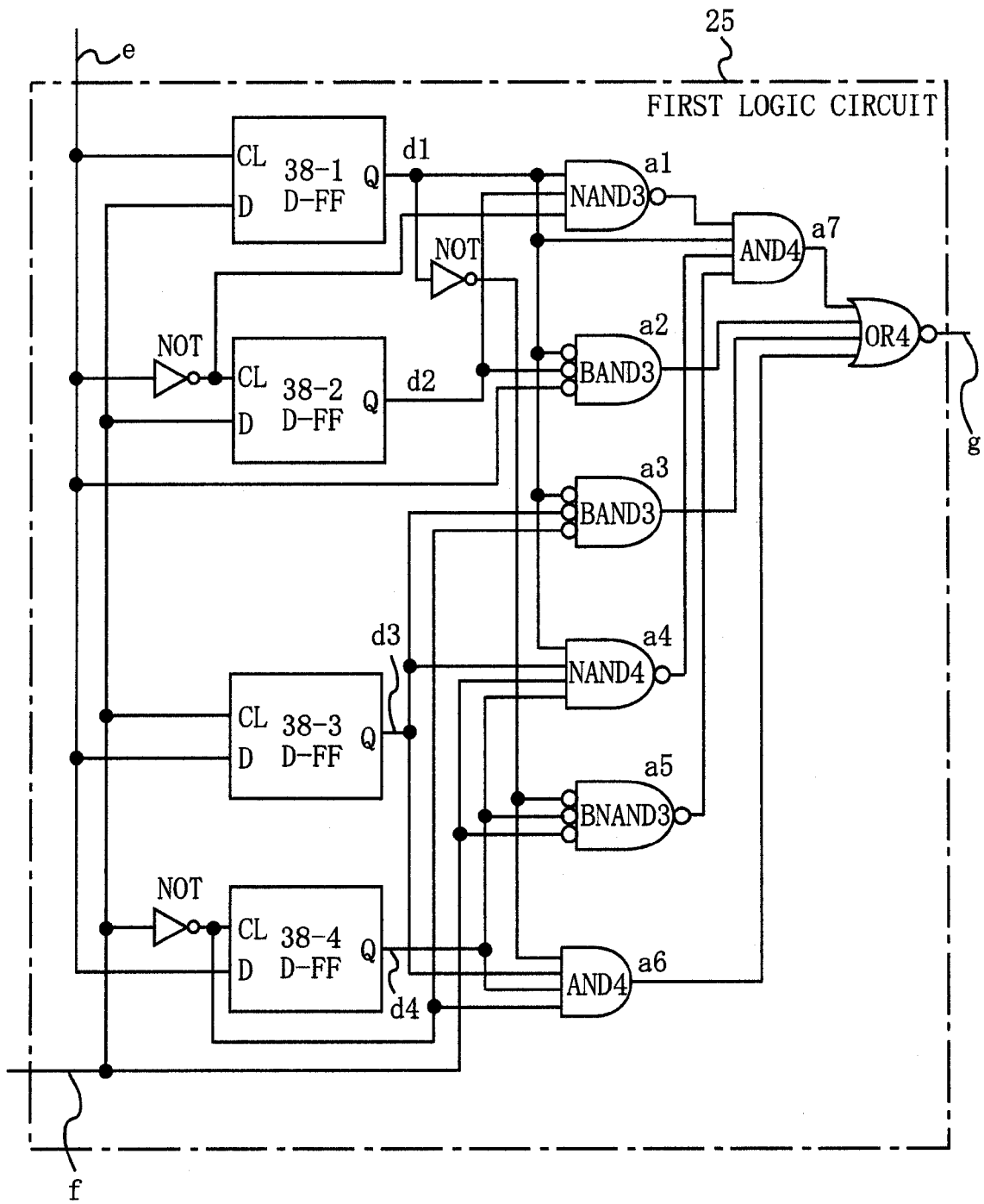
FIG. 2 is a detailed electric circuit diagram for a first logic circuit in FIG. 1.
Figure 3:
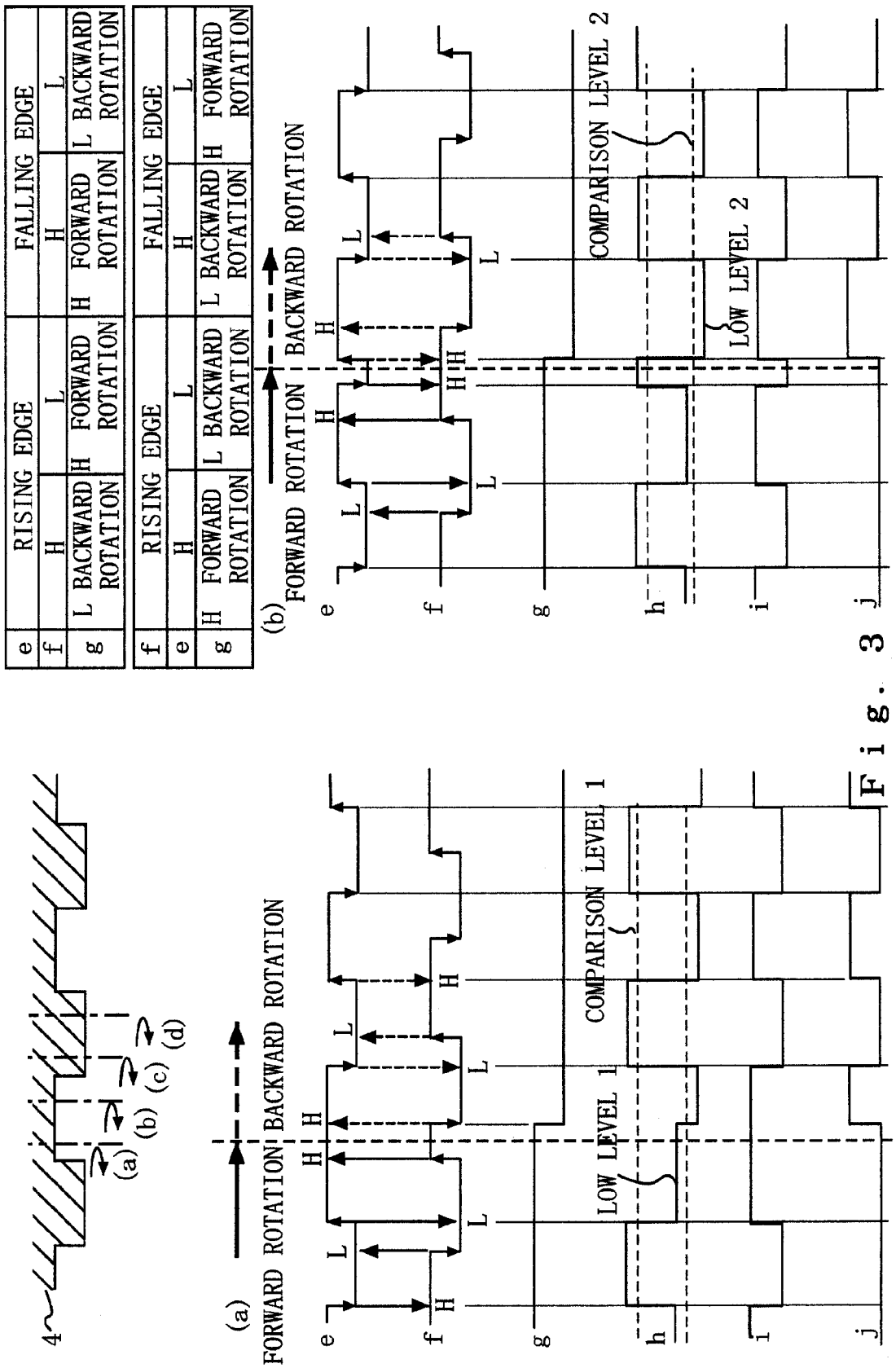
FIG. 3 is a set of waveforms, in the reversal patterns (a) and (b) of a magnetic moving body, at respective points in the electric circuit diagram illustrated in FIG. 1.
Figure 4:
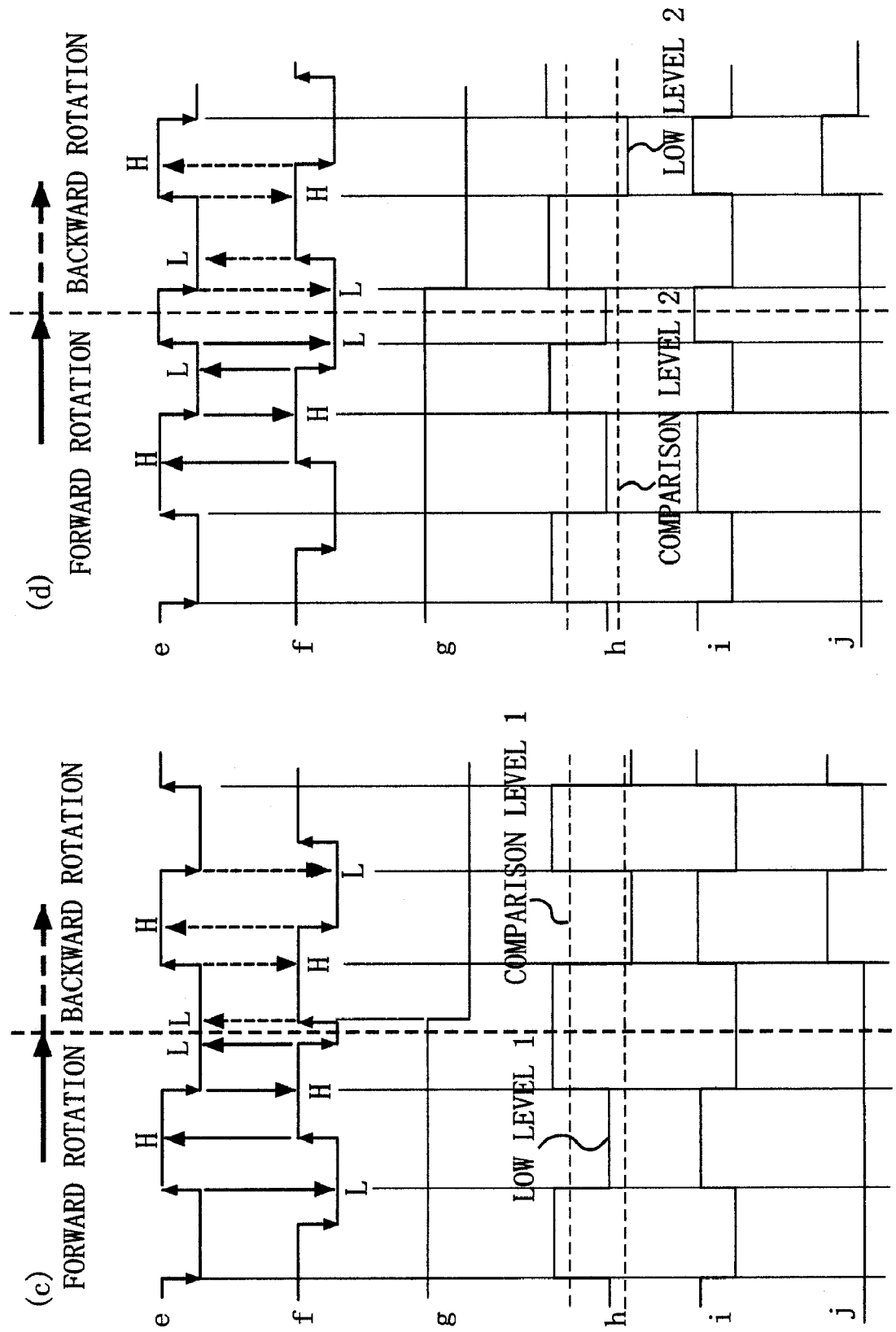
FIG. 4 is a set of waveforms, in the reversal patterns (c) and (d) of a magnetic moving body, at respective points in the electric circuit diagram illustrated in FIG. 1.
Figure 7:
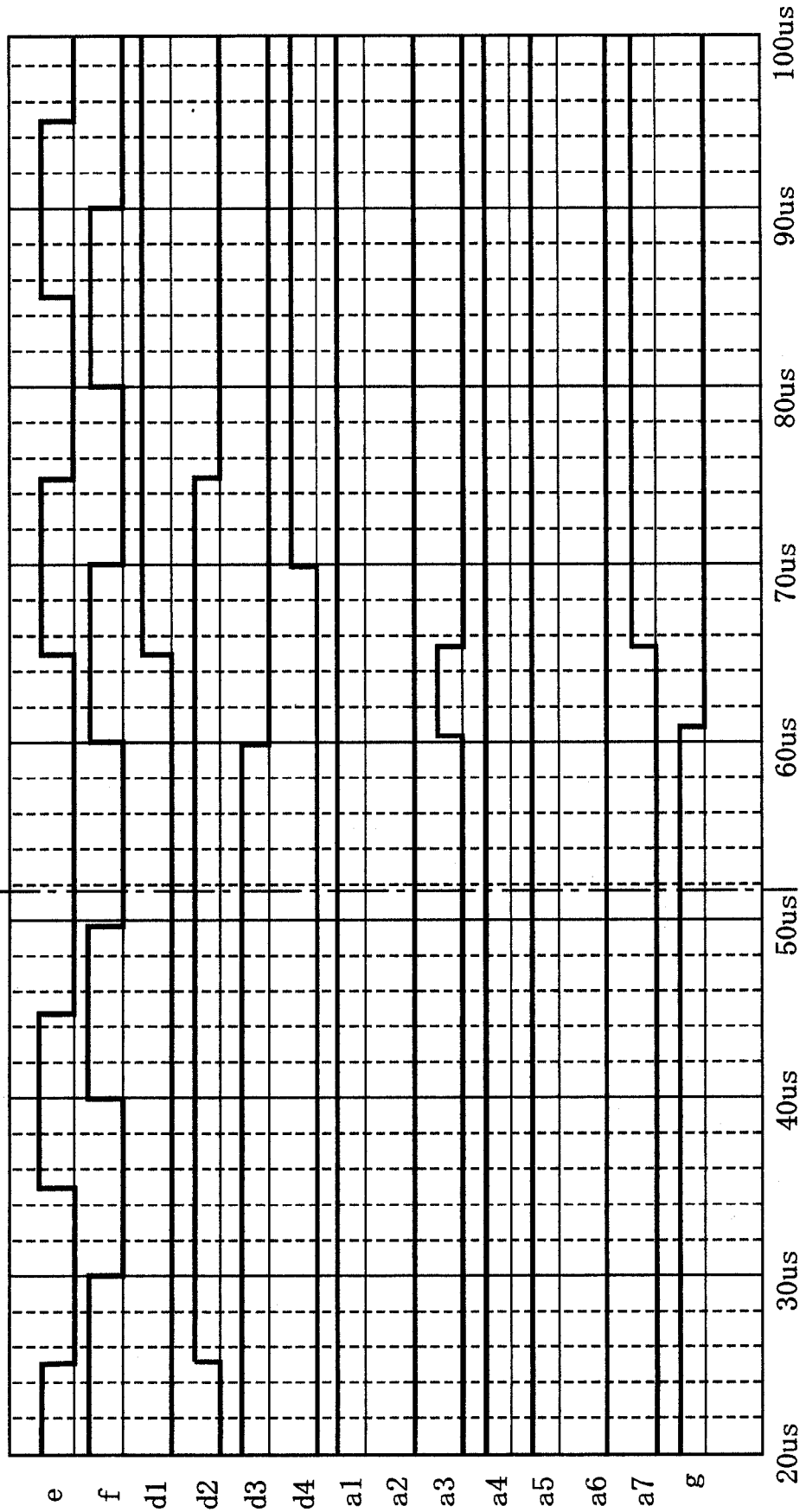
FIG. 7 is a set of waveforms, in the reversal pattern (c) of a magnetic moving body, at respective points in the electric circuit diagram illustrated in FIG. 2.
Figure 8:
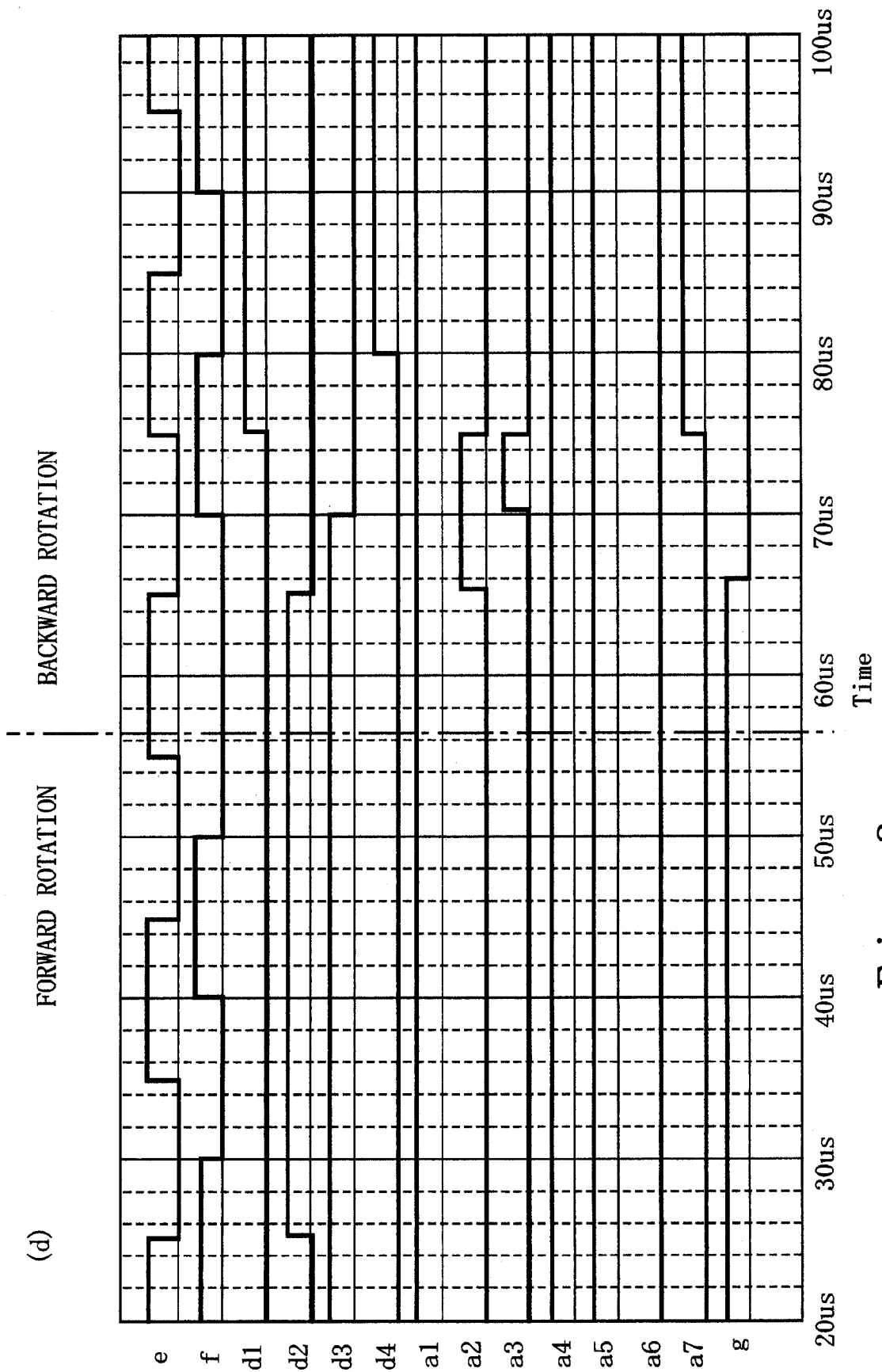
FIG. 8 is a set of waveforms, in the reversal pattern (d) of a magnetic moving body, at respective points in the electric circuit diagram illustrated in FIG. 2.
Figure 9:
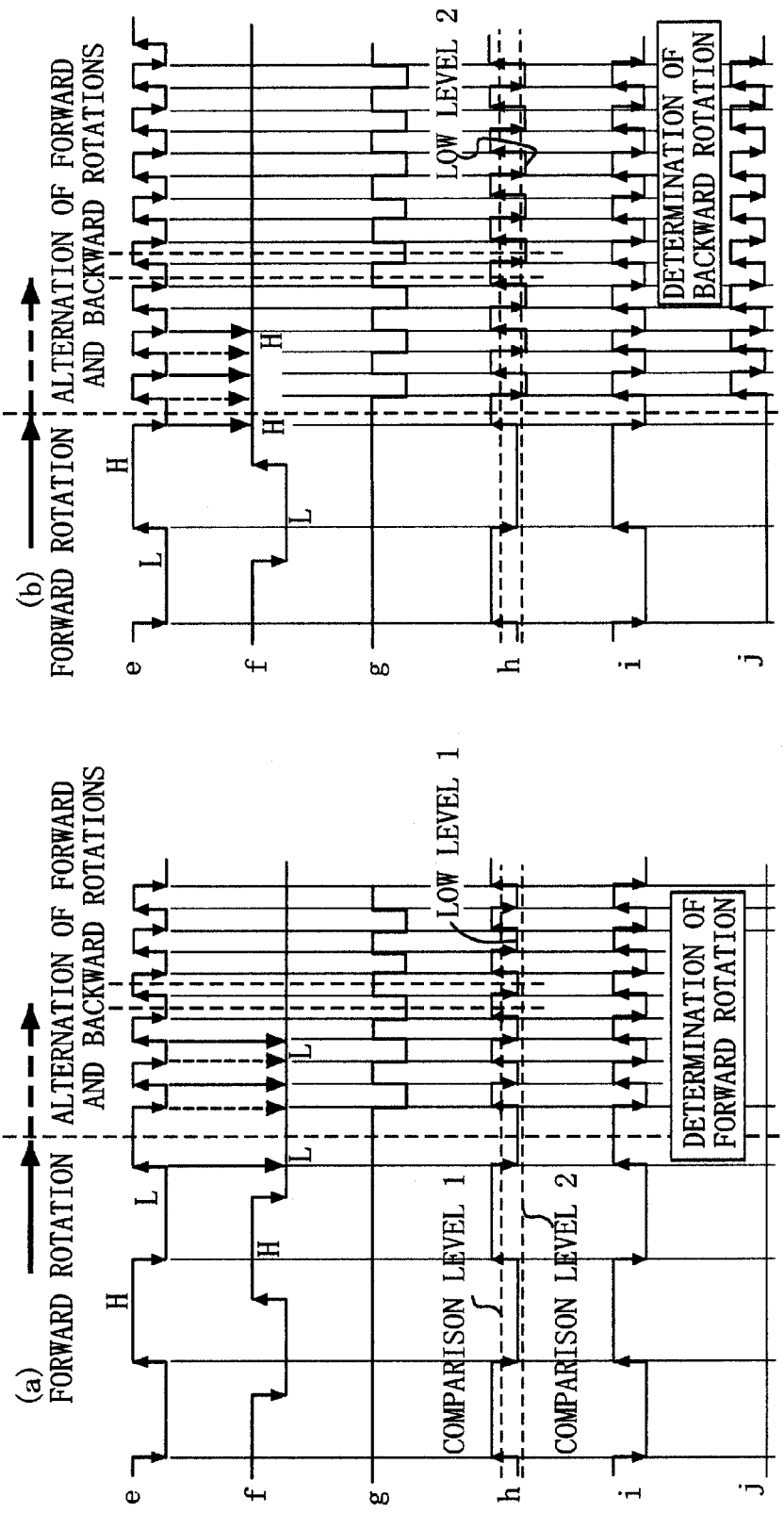
FIG. 9 is a set of waveforms, in the recurrent patterns (a) and (b) of a magnetic moving body, at respective points in the electric circuit diagram illustrated in FIG. 1.

FIG. 1 is an electric circuit diagram for a magnetic detection device according to the basic technology of the present invention. FIG. 2 is a detailed electric circuit diagram for a first logic circuit in FIG. 1. FIGS. 3 and 4 each are a set of waveforms, at the reversal position of a magnetic moving body, at respective points in the electric circuit diagram illustrated in FIG. 1; FIG. 3 also includes a diagram and a table for explaining the waveforms. FIGS. 5 to 8 each are a set of waveform charts, at the reversal position of a magnetic moving body, at respective points in the electric circuit diagram illustrated in FIG. 2. FIG. 9 is a set of waveforms, at the reversal position of a magnetic moving body, at respective points in the electric circuit diagram illustrated in FIG. 1; FIG. 9 also includes a diagram and a table for explaining the waveforms. In addition, in the figures including those for a conventional magnetic detection device, the same reference characters designate the same or similar components; therefore, the explanations therefor will be omitted.

Figure 19:
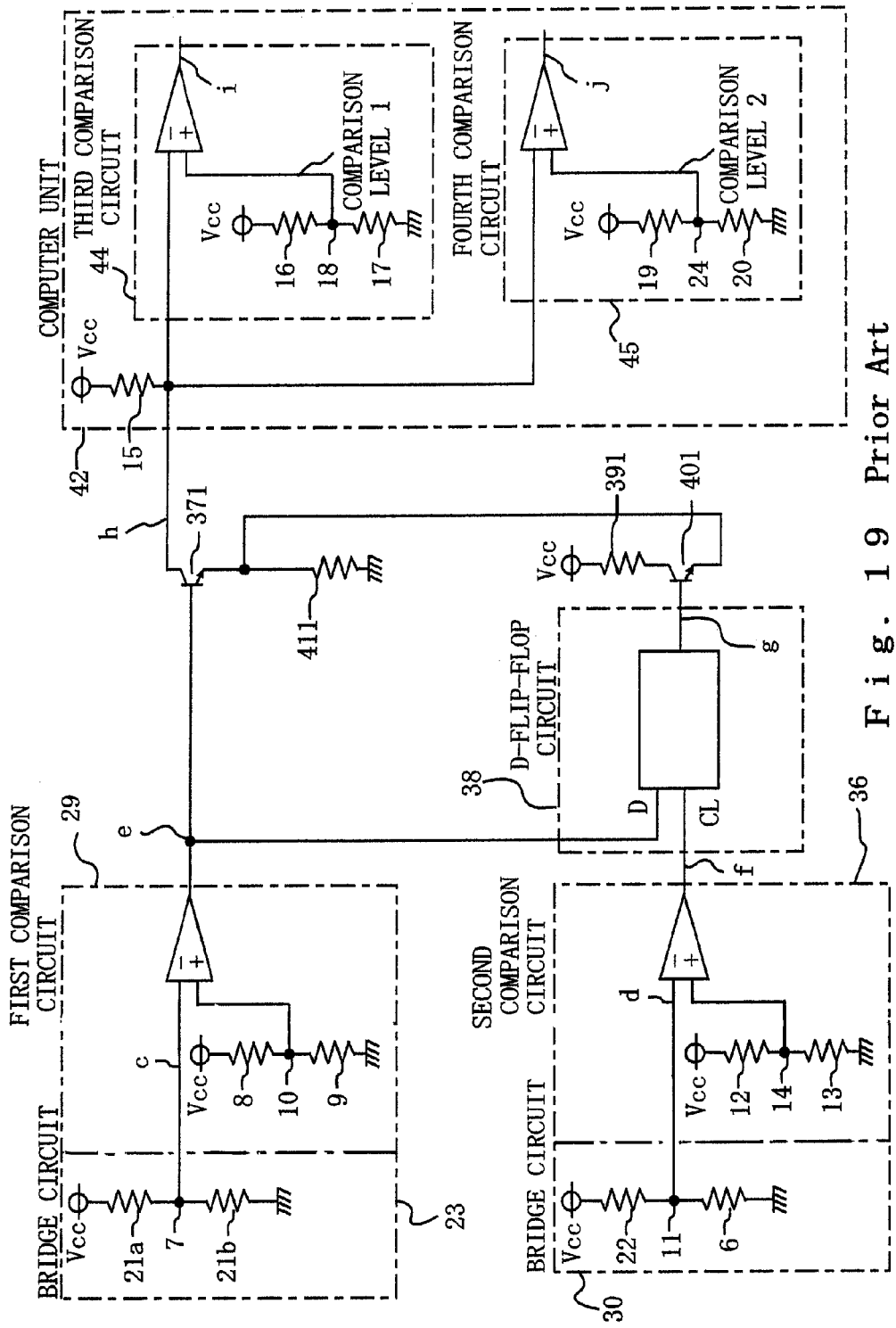
FIG. 19 is an electric circuit diagram for a conventional magnetic detection device.

The electric circuit diagram in FIG. 1 is the same as that in FIG. 19, except that the D-FF 38 in FIG. 19 is replaced by a first logic circuit 25 in FIG. 1. As illustrated in detail in FIG. 2, the number of D-flip-flop circuits (D-FFs) in the first logic circuit 25 is rendered four times so that the moving direction of a magnetic moving body is detected at the respective rising edges and the respective falling edges of the (rectangular wave) signals e and f.

Being combined, FIGS. 3 and 4 represent a set of waveforms, in reversal patterns (a), (b), (c), and (d) in which a magnetic moving body reverses its rotation direction from the forward to the backward rotation at a reversal position, at respective points in the electric circuit diagram illustrated in FIG. 1; FIG. 3 also includes a diagram and a table for explaining the waveforms. As represented at the top portion of FIG. 3, the magnetic moving body 4 facing MR elements reverses its rotation direction from the forward to the backward rotation at each of the reversal positions. The waveforms, in each of the reversal patterns (a), (b), (c), and (d), at the respective points in the electric circuit diagram in FIG. 1 are represented in FIGS. 3(a) and 3(b) and FIGS. 4(c) and 4(d). AS represented by the signal g in FIGS. 3(a) and 3(b) and FIGS. 4(c) and 4(d), at each reversal timing, the signal g becomes low-level (L) at the first edge after the reversal (the first edge out of the edges of the signals e and f), whereby the reversal of the magnetic moving body is detected. The tables at the top right of FIG. 3 represents the results of logic determinations in the first logic circuit 25; the foregoing tables suggest that the signal g of a high-level "H" (forward rotation) or the signal g of a low-level "L" (backward rotation) is outputted in accordance with the combination of the respective rising-edge states of the signal e and f, the respective falling-edge states of the signal e and f, the respective high-level values "H" of the signal e and f, the respective low-level values "L" of the signal e and f.

In the case of the reversal patterns (a) and (b) in FIGS. 3(a) and 3(b), respectively, the reversal is detected also at the first edge, after the reversal, of the signal j in the computer unit 42. In the case of the reversal patterns (c) and (d) in FIGS. 4(c) and 3(d), respectively, the reversal is detected, in the signal j, at the timing when the signal h firstly becomes low-level after the reversal.

FIG. 2 is a detailed electric circuit diagram for the first logic circuit 25 in FIG. 1; the first logic circuit 25 includes four D-FFs 38-1, 38-2, 38-3, and 38-4 whose outputs are d1, d2, d3, and d4, respectively. A D-FF is a circuit as described above; when the CL input thereof is "L (low-level)", the output thereof maintains the previous state, regardless of the level of the D terminal; in the case where, when the CL input is a rising edge trigger of "H (high-level)", the D terminal is "H", the output is rendered "H", and in the case where the D terminal is "L", the output is rendered "L". Accordingly, a D-FF can be referred to as a rising-edge D-flip-flop circuit. By connecting a NOT circuit to the CL terminal, the CL input rises at the timing when a falling edge trigger is applied to the input of the NOT circuit; thus, it is possible that, in the case where the D terminal is "H", the output is rendered "H", and in the case where the D terminal is "L", the output is rendered "L". Accordingly, a D-FF including a NOT circuit can be referred to as a falling-edge D-flip-flop circuit.

Figure 5:
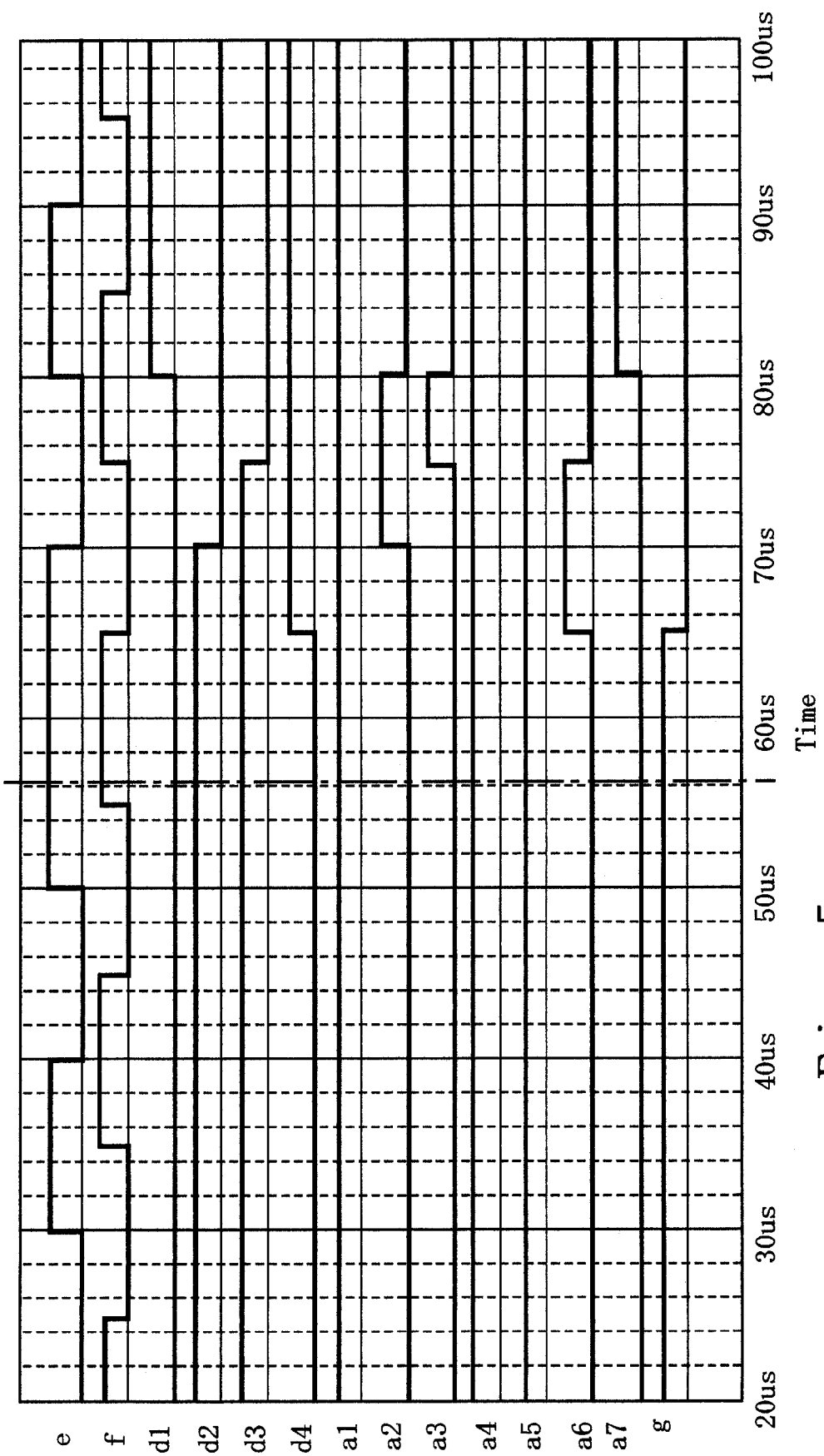
FIG. 5 is a set of waveforms, in the reversal pattern (a) of a magnetic moving body, at respective points in the electric circuit diagram illustrated in FIG. 2.
Figure 6:
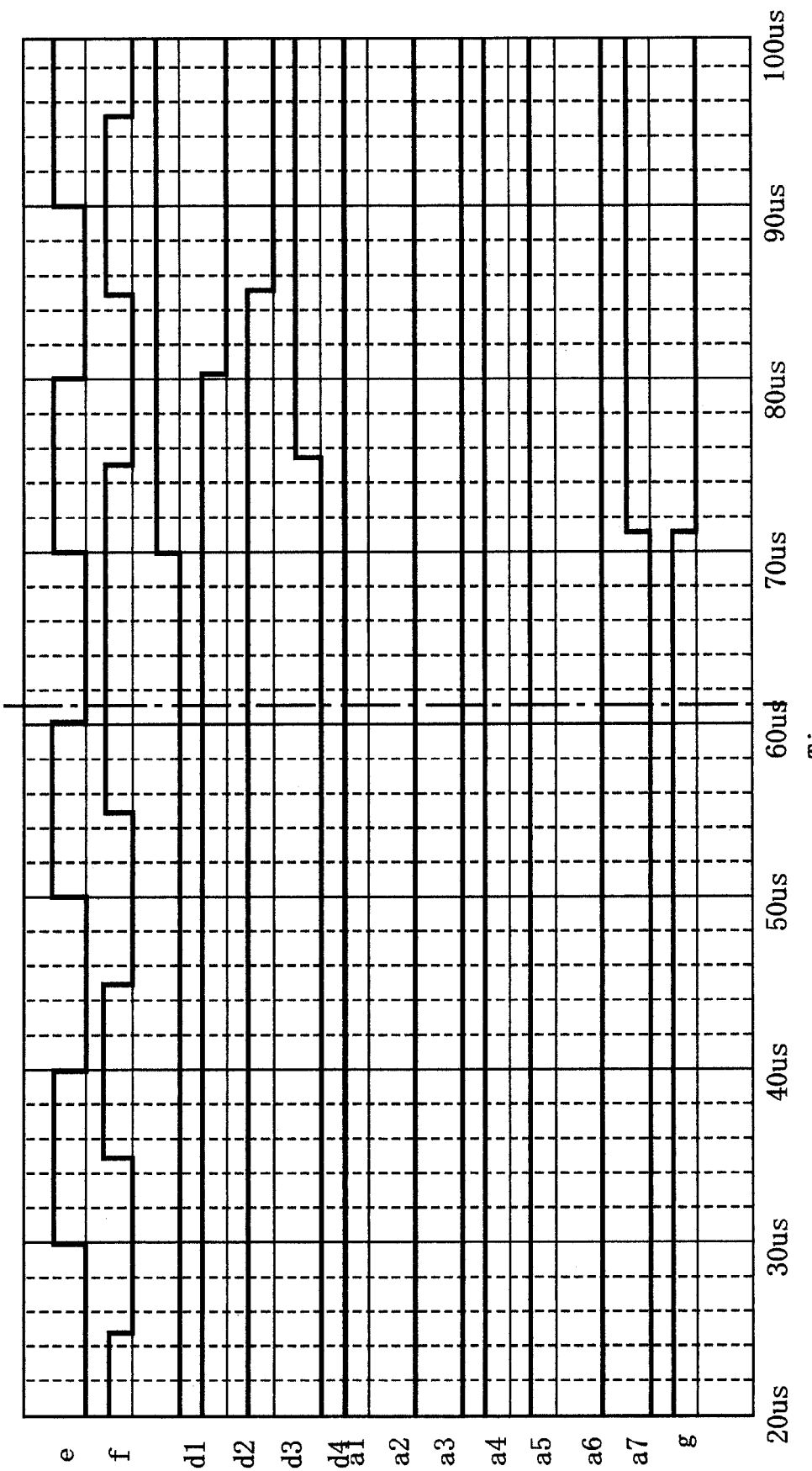
FIG. 6 is a set of waveforms, in the reversal pattern (b) of a magnetic moving body, at respective points in the electric circuit diagram illustrated in FIG. 2.

Each of the circuits having respective outputs a1 to a7 is an AND circuit or a circuit consisting of an AND circuit and a NOT circuit designated by a circle mark. An OR4 circuit consists of an OR circuit and a NOT circuit. FIG. 5 is a set of charts for the waveforms, in the reversal pattern (a) in which the magnetic moving body reverses its rotation direction from the forward to the backward rotation at the reversal position in FIG. 3, at respective points in the electric circuit diagram illustrated in FIG. 2. In addition, the "us" in the abscissa denotes the unit time. FIG. 6 is a set of charts for the waveforms, in the reversal pattern (b) in which the magnetic moving body reverses its rotation direction from the forward to the backward rotation at the reversal position in FIG. 3, at respective points in the electric circuit diagram illustrated in FIG. 2. FIG. 7 is a set of charts for the waveforms, in the reversal pattern (c) in which the magnetic moving body reverses its rotation direction from the forward to the backward rotation at the reversal position in FIG. 3, at respective points in the electric circuit diagram illustrated in FIG. 2. FIG. 8 is a set of charts for the waveforms, in the reversal pattern (d) in which the magnetic moving body reverses its rotation direction from the forward to the backward rotation at the reversal position in FIG. 3, at respective points in the electric circuit diagram illustrated in FIG. 2.

In FIG. 2, the signals e and f are inputted; in the case where, at the respective rising edges and the respective falling edges of the signals e and f, the magnetic moving body rotates forward, a high-level H signal is outputted as the signal g, and in the case of the backward rotation, a low-level L signal is outputted as the signal g. In other words, FIGS. 5 and 8 represent the waveforms, in reversal patterns (a), (b), (c), and (d) in which the magnetic moving body reverses its rotation direction from the forward to the backward rotation at the reversal position in FIG. 3, at respective points in the electric circuit diagram illustrated in FIG. 2. In FIGS. 5 to 8, depending on the phase relationship between the signal e and the signal f, the output d1 of the D-FF 38-1 maintains the state (H or L), of the signal f, at the timing of the rising edge of the signal e. The output d2 of the D-FF 38-2 maintains the state, of the signal f, at the timing of the falling edge of the signal e. Similarly, the output d3 of the D-FF 38-3 maintains the state, of the signal e, at the timing of the rising edge of the signal f. The output d4 of the D-FF 38-4 maintains the state, of the signal e, at the timing of the falling edge of the signal f. For example, the circuit having the output a1 receives the output d1, the output d2, and the inverted signal of the signal e and then outputs a1. Similarly, the respective circuits having a2, a3, a4, a5, a6, and a7 output a2, a3, a4, a5, a6, and a7. The output g of the circuit consisting of the OR4 and the NOT circuit is obtained from the outputs a7, a2, a3, and a6. As described above, in FIG. 2, the signals e and f are inputted; in the case where, at the respective rising edges and the respective falling edges of the signals e and f, the magnetic moving body rotates forward rotation, a high-level H signal is outputted as the signal g, and in the case of the backward rotation, a low-level L signal is outputted as the signal g.

Next, the case, in which the magnetic moving body alternates the forward rotation and the backward rotation at an arbitrary position, will be explained. FIG. 9 is a set of waveforms, in recurrent patterns (a) and (b) in which the magnetic moving body alternates the forward rotation and the backward rotation at the reversal position, at respective points in the electric circuit diagram illustrated in FIG. 1; FIG. 9 also includes a diagram and a table for explaining the waveforms. As represented at the top portion of FIG. 9, the magnetic moving body 4 facing MR elements alternates the forward and the backward rotation at each of the reversal positions. The waveforms, in each of the recurrent patterns (a) and (b), at the respective points in the electric circuit diagram in FIG. 1 are represented in FIGS. 9(a) and 9(b). The table at the top right of FIG. 9 represents the results of the logic determinations by the first logic circuit 25 and suggests that the signal g of a high-level "H" (forward rotation) or the signal g of a low-level "L" (backward rotation) is outputted in accordance with the combination of the rising-edge state of the signal e, the falling-edge state of the signal e, the high-level values "H" of the signal f, the low-level values "L" of the signal f.

As represented in FIG. 9, with regard to the signal g, the forward rotation and the backward rotation are alternately detected; however, with regard to the output waveforms i and j of the computer unit 42 that eventually determines the backward rotation or the forward rotation, in the case of FIG. 9(a), an erroneous determination for the forward rotation is caused, and in the case of FIG. 9(b), an erroneous determination for the backward rotation is caused. When the output transistor 371 is "OFF" (when the signal e is "L"), the level of the output h is a high level that is decided by the voltage at the power-source terminal Vcc in the computer unit 42, regardless of whether the magnetic moving body rotates forward or backward; in contrast, because, when the output transistor 371 is on (when the signal e is "H"), the signal g in the case of FIG. 9(a) is "H", the output h becomes the low level 1. However, because, when the output transistor 371 is on, the signal g in the case of FIG. 9(b) is "L", the output h becomes the low level 2.

Figure 20:
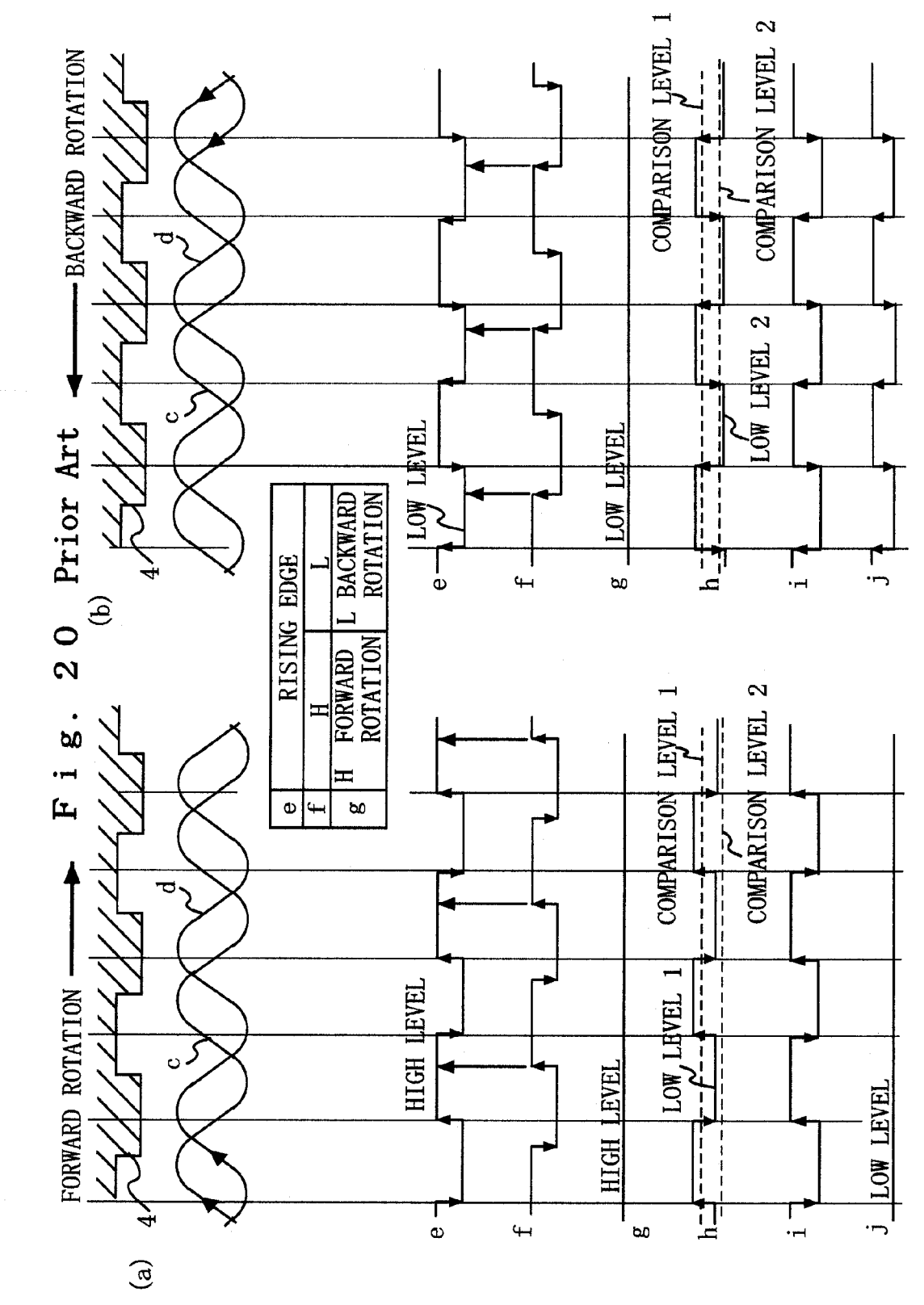

Accordingly, in the case of FIG. 9(a), the waveforms and j in the case where the forward rotation and the backward rotation are alternated become the same as the waveforms i and j in the case of the forward rotation represented in FIG. 20(a), whereby an erroneous determination for the forward rotation is caused. Additionally, in the case of FIG. 9(b), the waveforms i and j in the case where the forward rotation and the backward rotation are alternated become the same as the waveforms i and j in the case of the backward rotation represented in FIG. 20(b), whereby an erroneous determination for the backward rotation is caused. Thus, the present invention is to enable an excellent detection to be performed without making any erroneous discrimination even in the case of the alternate operation, between the forward rotation and the backward rotation, caused by a vibration, in the vicinity of the detection edge, of a magnetic moving body or the like.

EMBODIMENT 1

Figure 10:
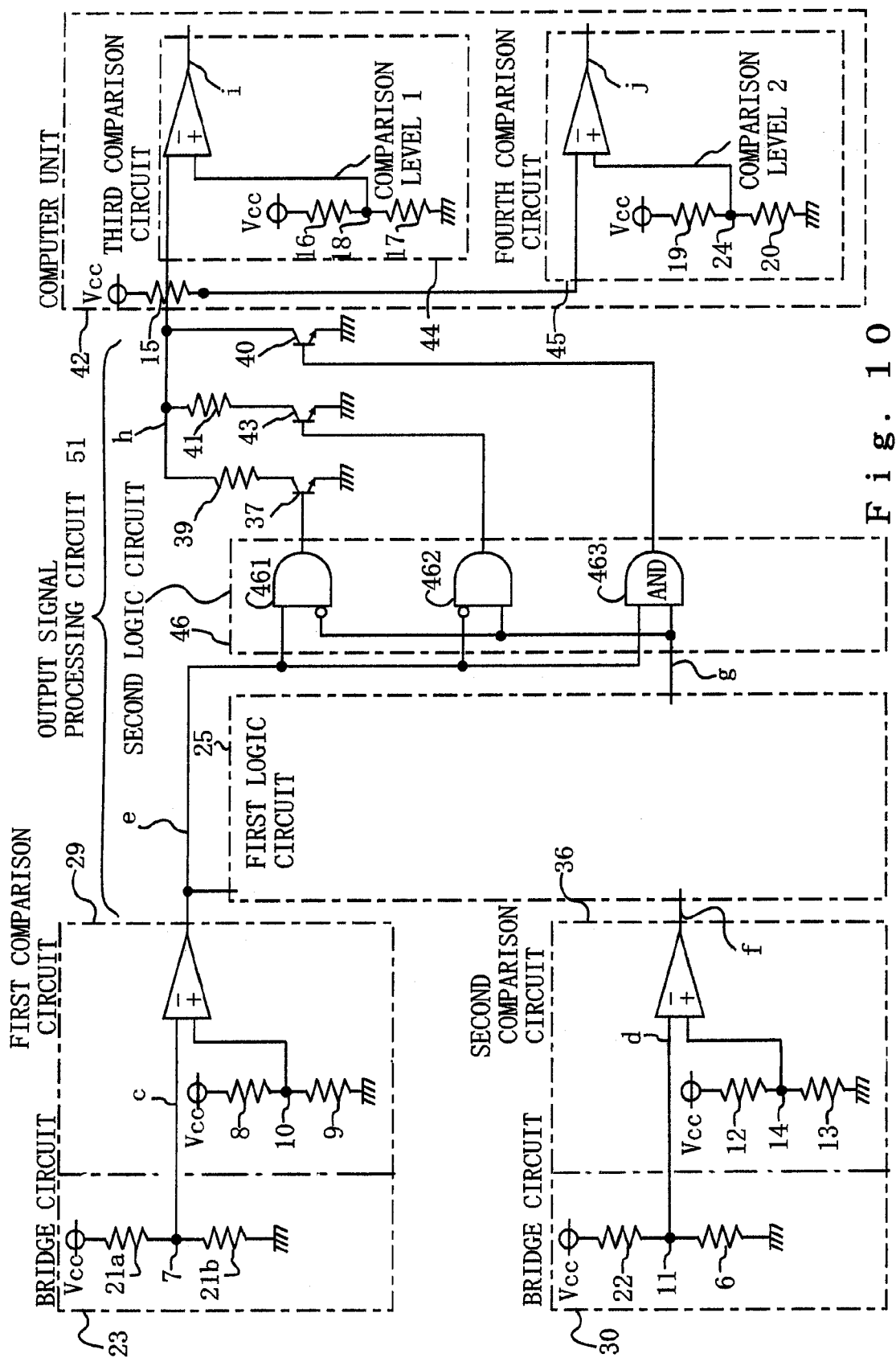
FIG. 10 is an electric circuit diagram for a magnetic detection device according to Embodiment 1.
Figure 11:
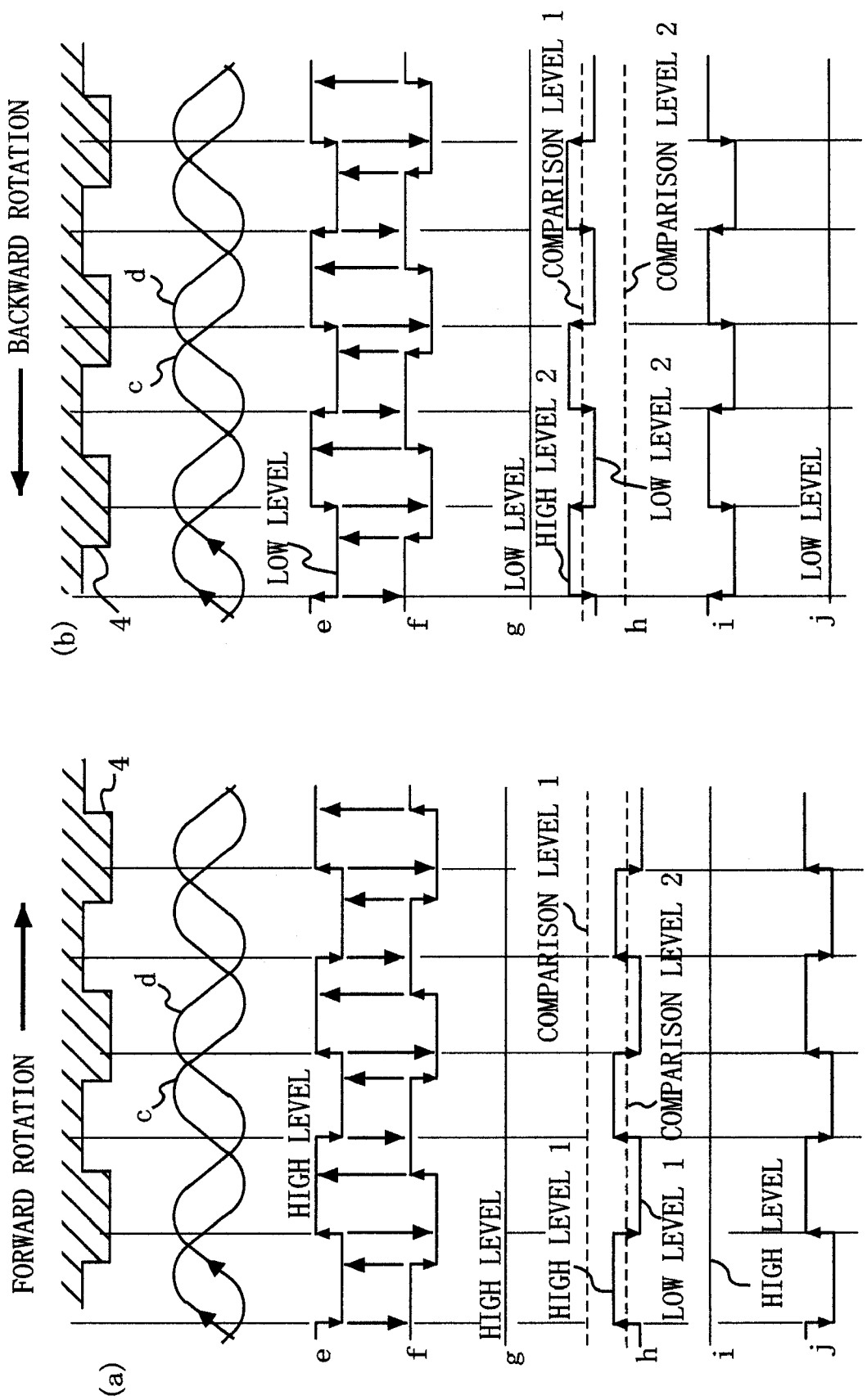
FIG. 11 is a set of waveforms, associated with the rotation of a magnetic moving body, at respective points in the electric circuit diagram illustrated in FIG. 10.
Figure 12:
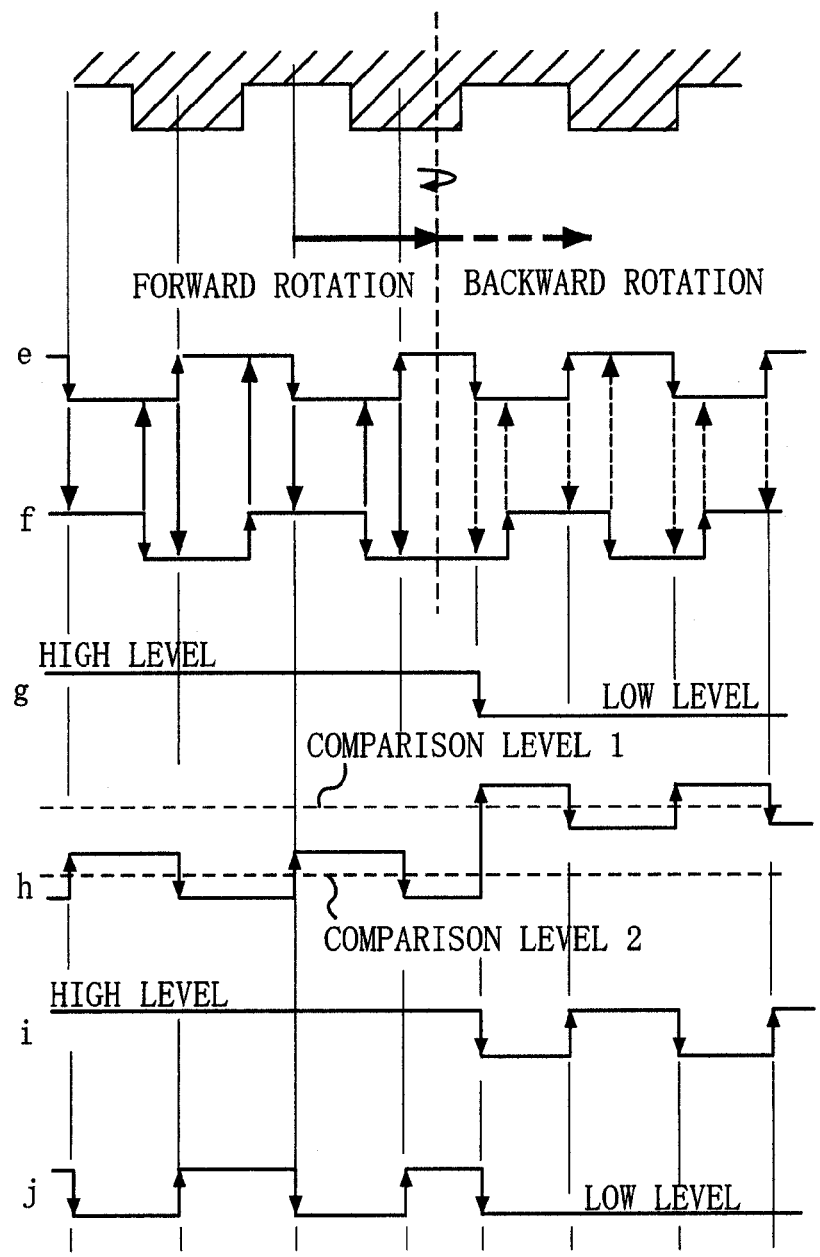
FIG. 12 is a set of waveforms, associated with the reversal of a magnetic moving body, at respective points in the electric circuit diagram illustrated in FIG. 10.

FIG. 10 is an electric circuit diagram for a magnetic detection device according to Embodiment 1. FIGS. 11 and 12 each are a set of waveforms, associated with the rotation of a magnetic moving body, at respective points in the electric circuit diagram illustrated in FIG. 10; FIG. 11 also includes a set of diagrams for explaining the waveforms; FIG. 12 also includes a set of tables and a diagram for explaining the waveforms. In FIG. 10, due to the movement of the magnetic moving body (detection subject), the resistance values of magnetic detection elements 21a, 21b, and 22 are changed, whereby two voltage changes c and d are obtained by means of bridge circuits 23 and 30. The voltage changes c and d are converted into rectangular waves by a first comparison circuit (first magnetoelectric conversion output circuit) 29 and a second comparison circuit (second magnetoelectric conversion output circuit) 36, respectively, so that rectangular wave signals e and f are obtained. The rectangular wave signals e and f are inputted to the first logic circuit 25 (in FIG. 2); from the phase relationship, between the rectangular wave signals e and f, based on the forward movement of the magnetic moving body, a signal g is obtained. In Embodiment 1, based on the forward movement of the magnetic moving body, the signal g of a high level "H" as a first signal (forward-rotation detection) is obtained.

From the phase relationship, between the rectangular wave signals e and f, based on the backward movement of the magnetic moving body, the signal g is obtained. In Embodiment 1, based on the backward movement of the magnetic moving body, the signal g of a low level "L" as a second signal (backward-rotation detection) is obtained.

Furthermore, the signal e, which is one of the rectangular wave signals, and the signal g are inputted to a second logic circuit 46. Three outputs of the second logic circuit 46 are inputted to the respective base terminals of output transistors 37, 43, and 40. The emitter terminals of the output transistors 37, 43, and 40 are earthed. The collector terminals of the output transistors 37 and 43 are connected, by way of resistors 39 and 41, respectively, to a terminal from which a sensor output signal h is outputted. The collector terminal of the output transistor 40 is also connected to the terminal from which the sensor output signal h is outputted. The resistor 41 has a resistance value that is smaller than that of the resistor 39. The terminal from which the sensor output signal h is outputted is connected to a computer unit 42 and then connected by way of a resistor 15 to a power source Vcc. The sensor output signal h is inputted to a third comparison circuit 44 and compared with a comparison level 1; after the comparison, a signal i is obtained. Additionally, the sensor output signal h is inputted to a fourth comparison circuit 45 and compared with a comparison level 2; after the comparison, a signal j is obtained.

The first and second logic circuits 25 and 46 and the output transistors 37, 43, and 40 configure an output signal processing circuit 51. Based on the signal g of the high level "H" as the first signal obtained due to the forward movement of the magnetic moving body and the output of the first comparison circuit (the first magnetoelectric conversion output circuit) 29, a pulse of a high level 1 and a low level 1 is obtained. In other words, based on the signal g of the high level "H" and the output "H" of the first comparison circuit 29, the high level "H" is generated from an AND circuit 463, whereupon the output transistor 40 turns on, resulting in generation of a signal of the low level 1 as the sensor output signal h (refer to FIG. 11(a)). Based on the signal g of the high level "H" and the output "L" of the first comparison circuit 29, the high level "H" is generated from a circuit 462, whereupon the output transistor 43 turns on, resulting in generation of a signal of the high level 1 as the sensor output signal h (refer to FIG. 11(a)).

Based on the signal g of the low level "L" as the second signal obtained due to the backward movement of the magnetic moving body and the output of the first comparison circuit (the first magnetoelectric conversion output circuit) 29, a pulse of a high level 2 and a low level 2 is obtained. In other words, based on the signal g of the low level "L" and the output "H" of the first comparison circuit 29, the high level "H" is generated from a circuit 461, whereupon the output transistor 37 turns on, resulting in generation of a signal of the low level 2 as the sensor output signal h (refer to FIG. 11(b)). Based on the signal g of the low level "L" and the output "L" of the first comparison circuit 29, the circuits 461, 462, and 463 all turn off, resulting in generation of a signal of the high level 2 as the sensor output signal h (refer to FIG. 11(b)).

The pulse (the pulse of the high level 1 and the low level 1 and the pulse of the high level 2 and the low level 2) outputted by the output signal processing circuit 51 is compared, in one (the fourth comparison circuit 45) of the comparison circuits, with one (comparison level 2) of the comparison levels, and then the result of the level comparison is outputted as the signal j. Similarly, the pulse (the pulse consisting of the high level 1 and the low level 1 and the pulse consisting of the high level 2 and the low level 2) outputted by the output signal processing circuit 51 is compared, in the other (the third comparison circuit 44) of the comparison circuits, with the other (comparison level 1) of the comparison levels, and then the result of the level comparison is outputted as the signal i.

In addition, the rectangular wave signals e and f may interchangeably be inputted to the output signal processing circuit 51.

The output signal processing circuit 51 is configured in such a way that the electric potential of the pulse of the high level 2 and the low level 2 is different from the electric potential of the pulse of the high level 1 and the low level 1, so that, referring to the waveforms of signal h represented in FIGS. 11(a) and 11(b), not only the pulse of the high level 1 and the low level 1 and the other comparison level (comparison level 1) do not intersect each other, but also the pulse of the high level 2 and the low level 2 and the one comparison level (comparison level 2) do not intersect each other. Explaining with reference to the waveform of the signal h represented in FIG. 11(a), the electric potential of the high level 1 may exceed the electric potential of the low level 2 so as to be closer to the comparison level 1, as long as the electric potential of the high level 1 does not intersect the comparison level 1. Similarly, explaining with reference to the waveform of the signal h represented in FIG. 11(b), the electric potential of the low level 2 may be rendered lower than that of the high level 1 so as to be closer to the comparison level 2, as long as the electric potential of the low level 2 does not intersect the comparison level 2.

Next, the operation will be explained. FIGS. 11 and 12 each are a set of waveforms at the points e, f, g, h, i, and j in the electric circuit diagram in FIG. 10; FIGS. 11(a), 11(b), and 12 represents a case where the magnetic moving body rotates forward, a case the magnetic moving body rotates backward, and a case where the magnetic moving body changes its rotation direction from the forward rotation to the backward rotation, respectively. As represented in FIG. 11, based on the combination of the signals e and f, the signal becomes high-level, in the case of the forward rotation in FIG. 11(a), and as the signal j, a signal (a forward-rotation signal having depressions and protrusions) corresponding to the depressions and protrusions of the magnetic moving body is outputted. In the case of the backward rotation in FIG. 11(b), the signal j becomes low-level, and as the signal i, a signal (a backward-rotation signal having depressions and protrusions) corresponding to the depressions and protrusions of the magnetic moving body is outputted. As described above, by means of the signals i and j, the computer unit can detect the signals corresponding to the depressions and protrusions of the magnetic moving body and the rotation direction. FIG. 12 represents waveforms in the case where the magnetic moving body changes its rotation direction from the forward rotation to the backward rotation; the sensor output signal h behaves as represented in FIG. 12. The table at the bottom of FIG. 12 represents the results of the logic determinations by the first logic circuit 25 and suggests that the signal g of the high-level "H" (forward rotation) or the signal g of the low-level "L" (backward rotation) is outputted based on the combination of the respective rising-edge states of the signals e and f, the respective falling-edge states of the signals e and f, the respective "H" states of the signals e and f, and the respective "L" states of the signals e and f.

Figure 13:
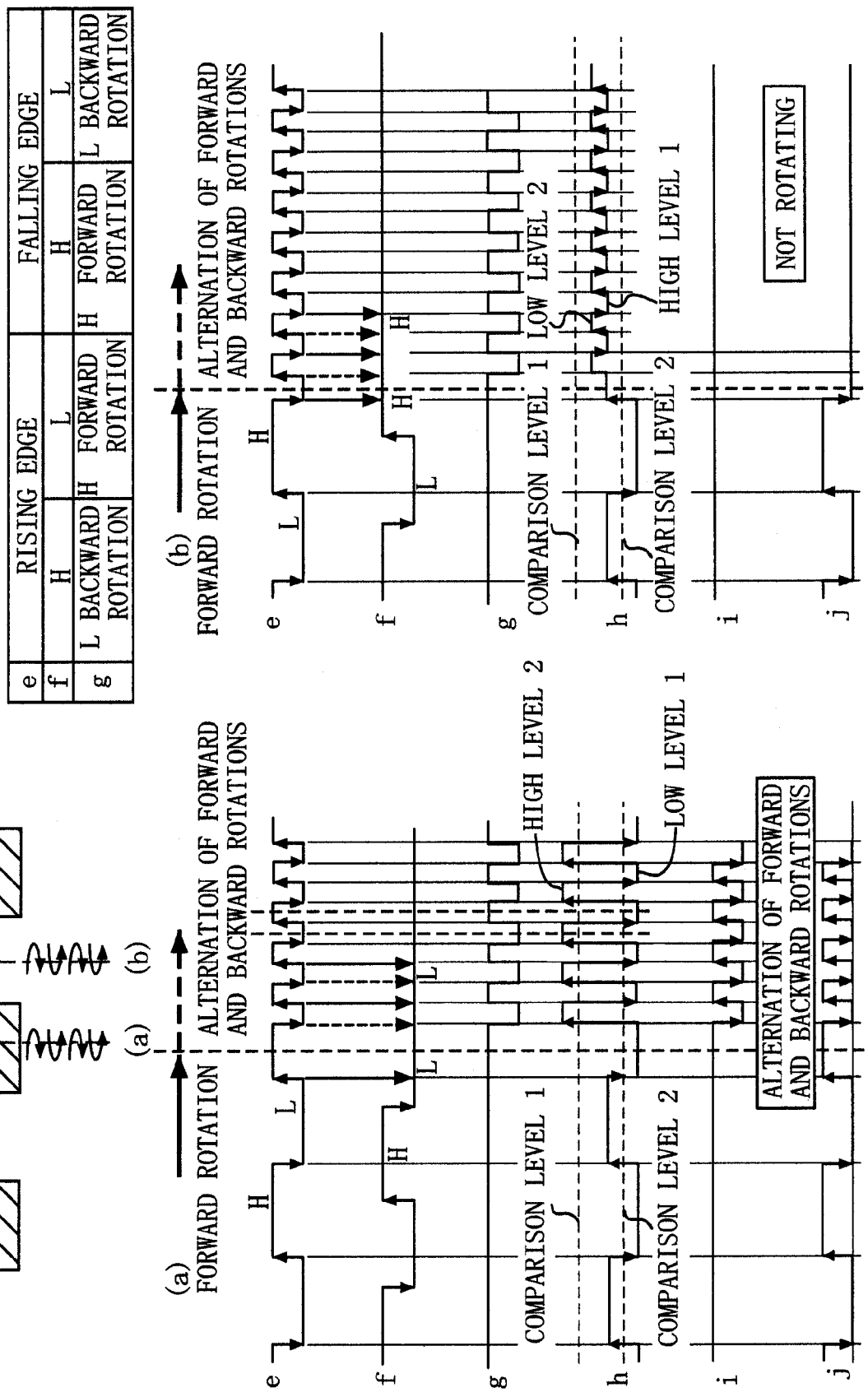
FIG. 13 is a set of waveforms, in the recurrent patterns (a) and (b) of a magnetic moving body, at respective points in the electric circuit diagram illustrated in FIG. 10.

FIG. 13 is a set of waveforms, in recurrent patterns (a) and (b) in which the magnetic moving body alternates the forward rotation and the backward rotation at the reversal position, at respective points in the electric circuit diagram illustrated in FIG. 10; FIG. 13 also includes a diagram and a table for explaining the waveforms. As represented at the top portion of FIG. 13, the magnetic moving body 4 facing MR elements alternates the forward and the backward rotation at each of the reversal positions. The waveforms, in each of the recurrent patterns (a) and (b), at the respective points in the electric circuit diagram in FIG. 10 are represented in FIGS. 13(a) and 9(b). The table at the top right of FIG. 13 represents the results of the logic determinations by the first logic circuit 25 and suggests that the signal g of a high-level "H" (forward rotation) or the signal g of a low-level "L" (backward rotation) is outputted based on the combination of the rising-edge state of the signal e, the falling-edge state of the signals e, the "H" state of the signals f, and the "L" state of the signal f.

In FIGS. 13(a) and 13(b), the waveforms, at the respective points, during the duration in which the magnetic moving body 4 rotates forward are the same as those in the case of the forward rotation in FIG. 11(a). During the duration, in FIG. 13(a), in which the forward rotation and the backward rotation are alternated, the alternation between the forward rotation and the backward rotation is made at a tooth portion of the magnetic moving body 4; because the reversal position corresponds to a position, on the rectangular wave signal e, where the low level "L" and the high level "H" of the rectangular wave signal e are switched over, the rectangular wave signal e alternately becomes "L" and "H". In contrast, because the reversal position corresponds to a position, on the rectangular wave signal f, during the time periods before and after which, the level of the rectangular wave signal f is the low level "L", the rectangular wave signal f holds the low level "L". Accordingly, in accordance with the table at the top right of FIG. 13, the signal g becomes low-level "L" (the backward rotation) or high-level "H" (the forward rotation), based on the combination of the falling-edge state and the rising-edge state of the rectangular wave signal e and the low level of the rectangular wave signal f (refer to the waveform g). Thus, as represented by the waveform h, the sensor output signal h becomes the high level 2 (the backward rotation) or the low level 1 (the forward rotation), whereby, as the signals i and j, the backward-rotation signal having depressions and protrusions and the forward-rotation signal having depressions and protrusions, respectively, are generated. Therefore, because the magnetic moving body 4 is neither in the forward rotation mode nor in the backward rotation mode, it can be determined that the magnetic moving body 4 is alternating the backward rotation and the forward rotation.

During the duration, in FIG. 13(b), in which the forward rotation and the backward rotation are alternated, the alternation between the forward rotation and the backward rotation is made at a depression portion of the magnetic moving body 4; because the reversal position corresponds to a position, on the rectangular wave signal e, where the low level "L" and the high level "H" of the rectangular wave signal e are switched over, the rectangular wave signal e alternately becomes "L" and "H". In contrast, because the reversal position corresponds to a position, on the rectangular wave signal f, during the time periods before and after which, the level of the rectangular wave signal f is the high level "H", the rectangular wave signal f holds the low level "H". Accordingly, in accordance with the table at the top right of FIG. 13, the signal g becomes low-level "L" (the backward rotation) or high-level "H" (the forward rotation), based on the combination of the rising-edge state and the falling-edge state of the rectangular wave signal e and the high level of the rectangular wave signal f (refer to the waveform g). Thus, as represented by the waveform h, the sensor output signal h becomes the low level 2 (the backward rotation) or the high level 1 (the forward rotation), whereby the signals i and j are fixed at the high-level "H" and the low-level "L", respectively. Therefore, neither of the two pulses is outputted, it can be determined that the magnetic moving body 4 is not rotating.

As described above, in both cases, an excellent detection can be performed without making any erroneous discrimination of the positional information on the magnetic moving body 4; therefore, an excellent detection can be performed without making any erroneous discrimination even in the case of the alternate operation, between the forward rotation and the backward rotation, caused by a vibration or the like in the vicinity of the detection edge. In addition, besides an MR element, a giant magnetoresistance element (GMR element), a tunnel magnetoresistance element, or a hall element can be utilized as the magnetic detection element (magnetoelectric conversion element).

Additionally, by utilizing a GMR element as the MR element, the output of the bridge circuit can be enlarged; thus, even in the case where the distance between the tooth-shaped magnetic moving body and the magnetic detection device is long, the detection can be performed, whereby the properties of the magnetic detection device are enhanced. Although the rate of change in the magnetoresistance of an MR element is 2 to 6%, the rate of change in the magnetoresistance of a GMR element is approximately 30%; therefore, the output of the bridge circuit in the case of a GMR element is 5 to 15 times as large as the output in the case of an MR element. Additionally, instead of the digital signal, an analogue signal may be utilized. As described heretofore, according to Embodiment 1, not only the moving direction of the magnetic moving body as a detection subject can be detected, but also the positional information on the magnetic moving body can be detected without making any erroneous discrimination. An excellent detection can be performed without making any erroneous discrimination even in the case of the alternate operation, between the forward rotation and the backward rotation, caused by a vibration or the like in the vicinity of the detection edge.

EMBODIMENT 2

Figure 14:
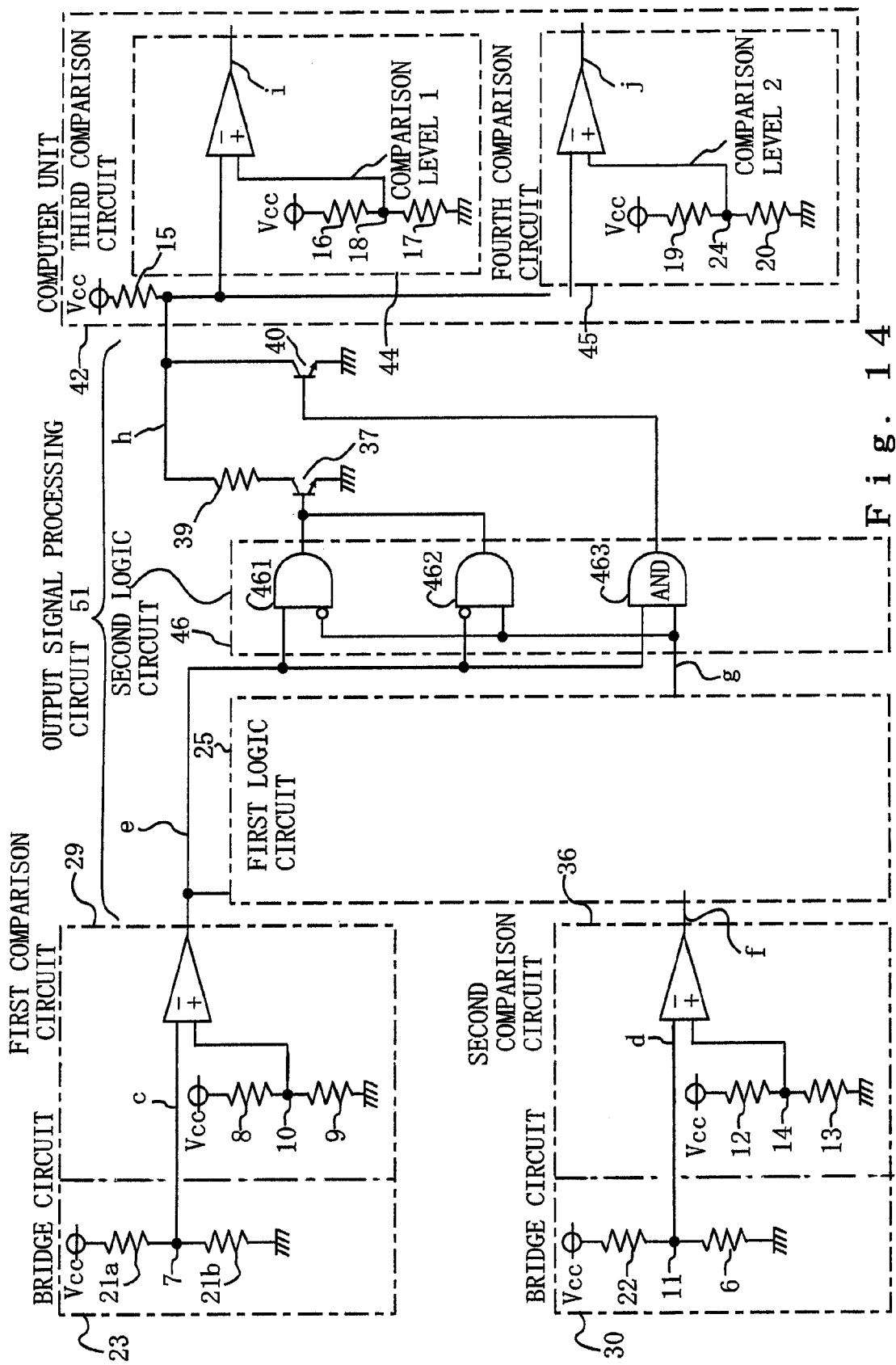
FIG. 14 is an electric circuit diagram for a magnetic detection device according to Embodiment 2.
Figure 15:
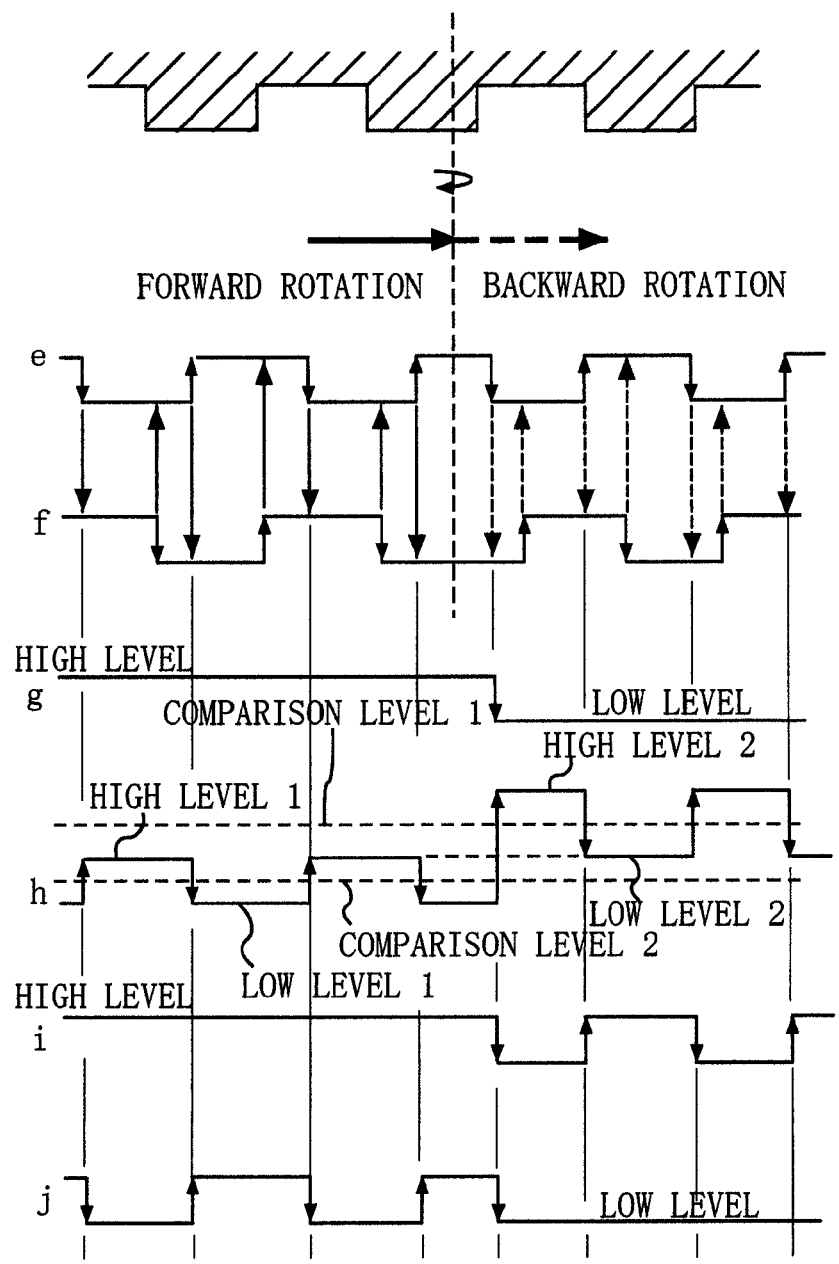
FIG. 15 is a set of waveforms, associated with the reversal of a magnetic moving body, at respective points in the electric circuit diagram illustrated in FIG. 14.

FIG. 14 is an electric circuit diagram for a magnetic detection device according to Embodiment 2. FIG. 15, which is a set of charts representing waveforms at the points e, f, g, h, i, and j in the electric circuit diagram in FIG. 14, represents the operation at the timing when a magnetic moving body changes its rotation direction from the forward rotation to the backward rotation. The difference between the respective electric circuit diagrams in FIGS. 14 and 10 will mainly be explained. In FIG. 14, the outputs of the circuits 461 and 462 in the second logic circuit 46 are connected to the base terminal of the output transistor 37, and the output of the circuit 463 is connected to the base terminal of the output transistor 40. The emitter terminals of the output transistors 37 and 40 are earthed.

The collector terminal of the output transistor 37 is connected by way of the resistor 39 to a terminal from which the sensor output signal h is outputted. The collector terminal of the output transistor 40 is also connected to the terminal from which the sensor output signal h is outputted. The terminal from which the sensor output signal h is outputted is connected to the computer unit 42 and then connected by way of the resistor 15 to the power source Vcc. After that, as is the case with FIG. 10, the sensor output signal h is inputted to the third comparison circuit 44 and compared with the comparison level 1; after the comparison, the signal i is obtained. Additionally, the sensor output signal h is inputted to the fourth comparison circuit 45 and compared with the comparison level 2; after the comparison, the signal j is obtained.

With the foregoing configuration, a pulse of the high level 1 and the low level 1 is obtained, based on the signal g of the high level "H" as the first signal obtained due to the forward movement of the magnetic moving body and the output of the first comparison circuit 29. In other words, based on the signal g of the high level "H" and the output "H" of the first comparison circuit 29, the high level "H" is generated from the AND circuit 463, whereupon the output transistor 40 turns on, resulting in generation of a signal of the low level 1 as the sensor output signal h (refer to FIG. 15). Based on the signal g of the high level "H" and the output "L" of the first comparison circuit 29, the high level "H" is generated from the circuit 462, whereupon the output transistor 37 turns on, resulting in generation of a signal of the high level 1 as the sensor output signal h (refer to FIG. 15).

Based on the signal g of the low level "L" as the second signal obtained due to the backward movement of the magnetic moving body and the output of the first comparison circuit 29, a pulse of the high level 2 and the low level 2 is obtained. In other words, based on the signal g of the low level "L" and the output "H" of the first comparison circuit 29, the high level "H" is generated from the circuit 461, whereupon the output transistor 37 turns on, resulting in generation of a signal of the low level 2 as the sensor output signal h (refer to FIG. 15). Based on the signal g of the low level "L" and the output "L" of the first comparison circuit 29, the circuits 461, 462, and 463 all turn off, resulting in generation of a signal of the high level 2 as the sensor output signal h (refer to FIG. 15).

In this situation, both the signal of the high level 1 based on the forward movement of the magnetic moving body and the signal of the low level 2 based on the backward movement of the magnetic moving body are the sensor output signal h when the output transistor 37 turns on; therefore, the two signals have the same electric potential level. All other operation of the magnetic detection device illustrated in FIG. 14 is the same as that of Embodiment 1.

Figure 16:
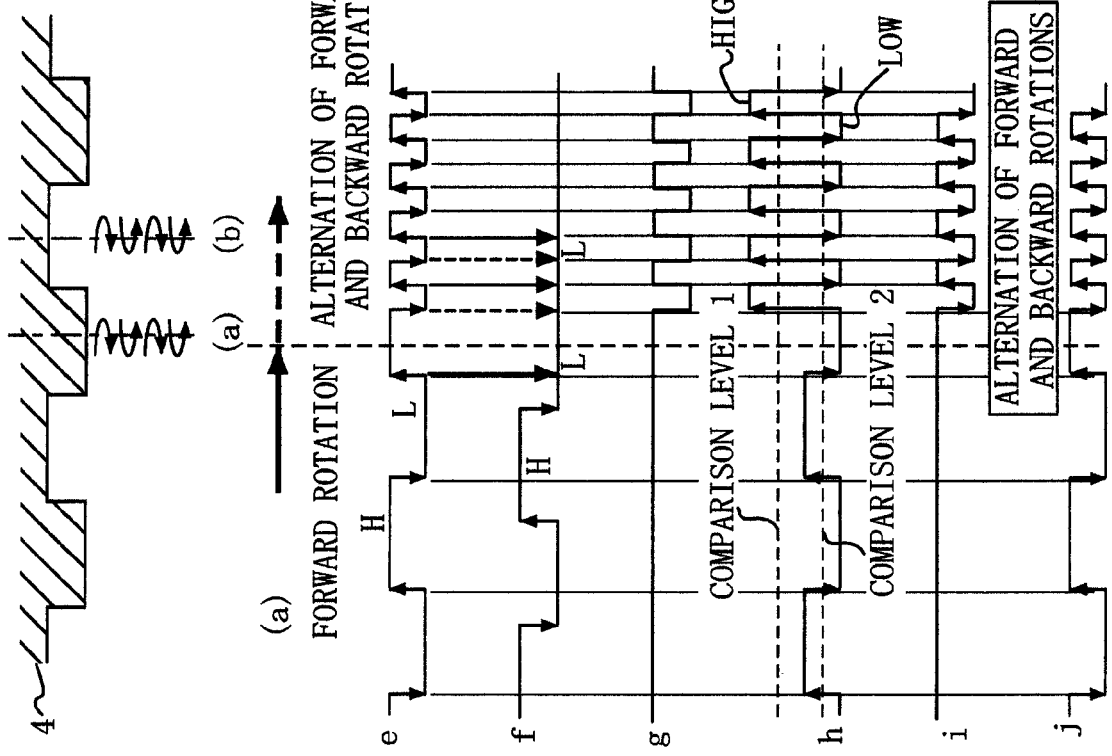
FIG. 16 is a set of waveforms, in the recurrent patterns (a) and (b) of a magnetic moving body, at respective points in the electric circuit diagram illustrated in FIG. 14.

FIGS. 16(a) and 16(b) each are a set of waveforms, in recurrent patterns (a) and (b) in which the magnetic moving body alternates the forward rotation and the backward rotation at the reversal position, at respective points in the electric circuit diagram illustrated in FIG. 14; FIG. 16 also includes a table and a diagram for explaining the waveforms. As represented in FIG. 16, during the duration, in FIG. 16(a), in which the forward rotation and the backward rotation are alternated, the magnetic moving body 4 alternates the forward rotation and the backward rotation at its tooth portion; thus, as represented by the waveform h, the sensor output signal h becomes the high level 2 (the backward rotation) or the low level 1 (the forward rotation), whereby, as the signals i and j, the backward-rotation signal having depressions and protrusions and the forward-rotation signal having depressions and protrusions, respectively, are generated. Therefore, because the magnetic moving body 4 is neither in the forward rotation mode nor in the backward rotation mode, it can be determined that the magnetic moving body 4 is alternating the backward rotation and the forward rotation. During the duration, in FIG. 16(b), in which the forward rotation and the backward rotation are alternated, the magnetic moving body 4 alternates the forward rotation and the backward rotation at its depression portion; thus, as represented by the waveform h, the sensor output signal h becomes the low level 2 (the backward rotation), i.e, the high level 1 (the forward rotation), whereby, the signals i and j are fixed at the high level and at the low level, respectively. Therefore, neither of the two pulses is outputted, it can be determined that the magnetic moving body 4 is not rotating. As described above, in both cases, an excellent detection can be performed without making any erroneous discrimination of the positional information on the magnetic moving body 4. As described heretofore, in Embodiment 2, not only the same operation as that of Embodiment 1 can be performed, but also, as illustrated in the electric circuit diagram in FIG. 14, one each of the output transistors and the resistors are removed, whereby the cost reduction can be achieved.

EMBODIMENT 3

Figure 17:
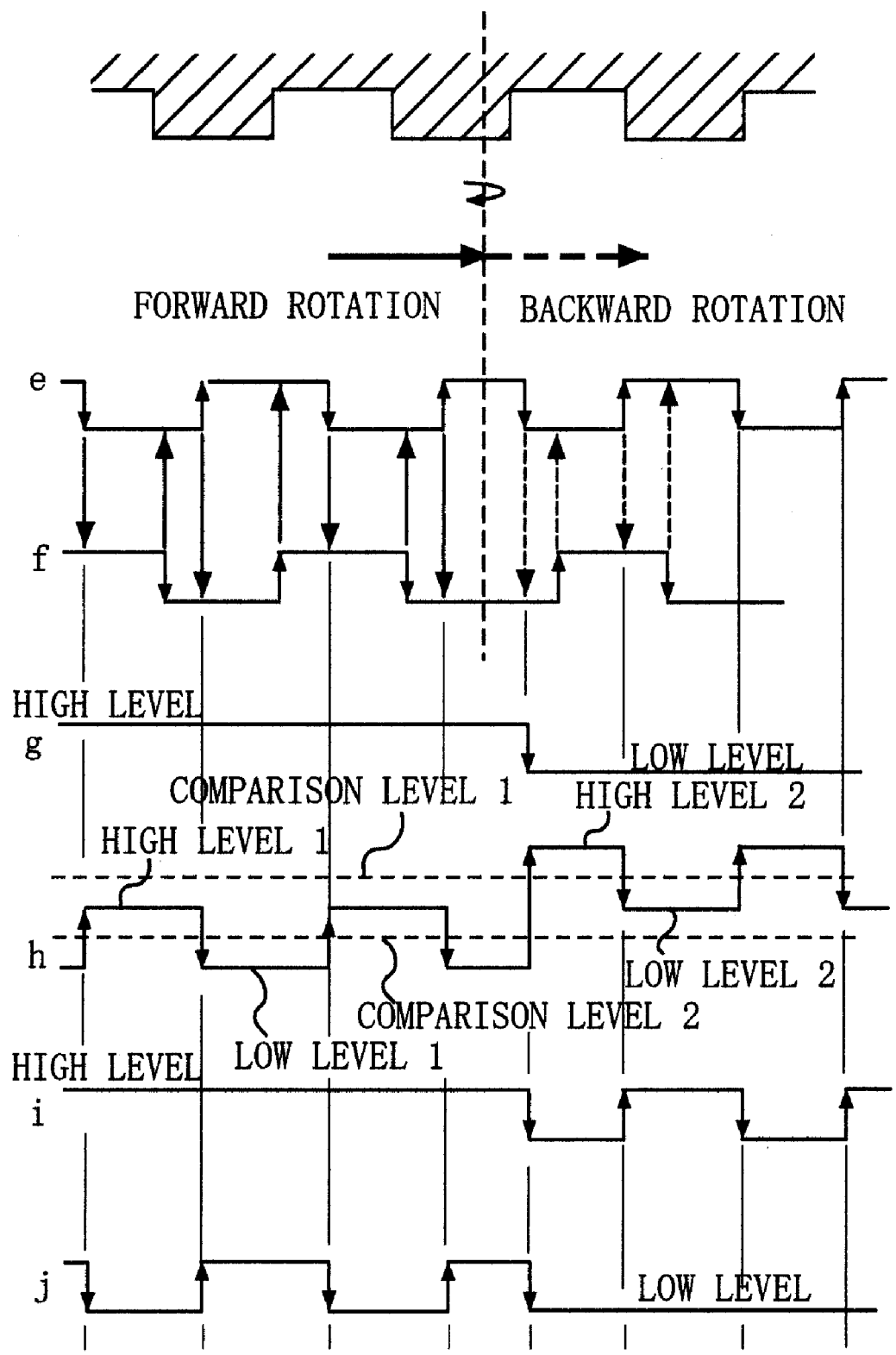
FIG. 17 is a set of waveforms, associated with the reversal of a magnetic moving body according to Embodiment 3, at respective points in the electric circuit diagram illustrated in FIG. 14.

FIG. 17, which is a set of charts representing waveforms at the points e, f, g, h, i, and j in the electric circuit diagram in FIG. 14, according to Embodiment 3, represents the operation at the timing when a magnetic moving body changes its rotation direction from the forward rotation to the backward rotation. Embodiment 3 is obtained by setting, to an optimal value, the resistance value of the resistor 39 in the electric circuit diagram in FIG. 14, according to Embodiment 2, in such a way that, when, with regard to the signal h represented in FIG. 17, the high level and the low level of the sensor output signal h in the case of the forward rotation are set to the high level 1 and the low level 1, respectively, and the high level and the low level of the sensor output signal h in the case of the backward rotation are set to the high level 2 and the low level 2, respectively, the high level 1, the low level 2, and ½×(the high level 2–the low level 1) are nearly equal to one another. Other constituent elements are the same as those in Embodiment 2. It goes without saying that Embodiment 3 demonstrates the same detection performance as that of Embodiment 2; furthermore, as can be seen from the signal h in FIG. 17, the setting margin for the comparison level 1 and the comparison level 2 for the computer unit are raised. In addition, the setting margin for the comparison levels of the computer unit, which receives the sensor signal h, can be raised.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A magnetic detection device comprising:
   first and second magnetoelectric conversion elements, which are disposed in a biasing magnetic field in such a way as to be in a row along a direction in which a tooth-shaped magnetic moving body as a detection subject moves and to face the tooth-shaped magnetic moving body, for producing changes in electric quantity in accordance with a condition change, in the biasing magnetic field, due to the movement of the detection subject;
   a first magnetoelectric conversion output circuit for outputting a change in electric quantity produced by the first magnetoelectric conversion element;
   a second magnetoelectric conversion output circuit for outputting a change in electric quantity produced by the second magnetoelectric conversion element;
   an output signal processing circuit for outputting a first signal in accordance with a mutual phase relationship between the output of the first magnetoelectric conversion output circuit and the output of the second magnetoelectric conversion output circuit based on the movement, in forward direction, of the detection subject and based on the first signal output and the output of the magnetoelectric conversion output circuit, generating a pulse of a high level 1 and a low level 1 and for outputting a second signal in accordance with the mutual phase relationship between the output of the first magnetoelectric conversion output circuit and the output of the second magnetoelectric conversion output circuit based on the movement, in backward direction, of the detection subject and based on the second signal output and the output of the magnetoelectric conversion output circuit, generating a pulse of a high level 2 and a low level 2 that each are different from at least one of the high level 1 and the low level 1;
   one comparison circuit for comparing a pulse outputted by the output signal processing circuit with one comparison level and outputting the comparison result; and
   the other comparison circuit for comparing a pulse outputted by the output signal processing circuit with the other comparison level that is different from the one comparison level and outputting the comparison result,
   wherein the output signal processing circuit is configured in such a way that not only the pulse of the high level 1 and the low level 1 does not cross the other comparison level, but also the pulse of the high level 2 and the low level 2 does not cross the one comparison level.

2. The magnetic detection device according to claim 1, wherein the output signal processing circuit is configured in such a way as to change the electric potential of the pulse of the high level 1 and the low level 1 or the electric potential of the pulse of the high level 2 and the low level 2 so that not only the pulse of the high level 1 and the low level 1 does not cross the other comparison level, but also the pulse of the high level 2 and the low level 2 does not cross the one comparison level.

3. The magnetic detection device according to claim 2, wherein a logic circuit and a transistor are utilized in order to change the electric potential of the pulse of the high level 1 and the low level 1 or the electric potential of the pulse of the high level 2 and the low level 2.

4. The magnetic detection device according to claim 1, wherein the output signal processing circuit is configured in such a way that the electric potentials of the high level 1 and the low level 2 are the same.

5. The magnetic detection device according to claim 4, wherein the output signal processing circuit is configured in such a way that the high level 1≅ the low level 2≅½×(the high level 2–the low level 1).

6. The magnetic detection device according to claim 1, wherein the output signal processing circuit includes a first rising-edge D-flip-flop circuit that is triggered by the rising edge of the output signal of the first magnetoelectric conversion output circuit; a second rising-edge D-flip-flop circuit that is triggered by the rising edge of the output signal of the second magnetoelectric conversion output circuit; a first falling-edge D-flip-lop circuit that is triggered by the falling edge of the output signal of the first magnetoelectric conversion output circuit; and a second falling-edge D-flip-flop circuit that is triggered by the falling edge of the output signal of the second magnetoelectric conversion output circuit.

* * * * *